(12) United States Patent
Atieh et al.

(10) Patent No.: US 10,138,404 B1
(45) Date of Patent: *Nov. 27, 2018

(54) HEAT TRANSFER MEDIUM CONTAINING MULTI-WALL CARBON NANOTUBES

(71) Applicant: King Fahd University of Petroleum and Minerals, Dhahran (SA)

(72) Inventors: Muataz Ali Atieh, Doha (QA); Abdallah Darweesh Manasrah, Dhahran (SA); Usamah Ahmad Al-Mubaiyedh, Dhahran (SA); Tahar Laoui, Dhahran (SA); Rached Ben-Mansour, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,275

(22) Filed: Jul. 13, 2018

Related U.S. Application Data

(63) Continuation of application No. 15/882,413, filed on Jan. 29, 2018, now Pat. No. 10,077,391, which is a continuation of application No. 14/752,297, filed on Jun. 26, 2015, now Pat. No. 9,879,167.

(51) Int. Cl.
*C09K 5/10* (2006.01)
*F28F 23/00* (2006.01)

(52) U.S. Cl.
CPC .............. *C09K 5/10* (2013.01); *F28F 23/00* (2013.01); *F28F 2255/20* (2013.01)

(58) Field of Classification Search
CPC .................... C09K 5/10; F28F 23/00
USPC ......................................... 252/71
See application file for complete search history.

(56) References Cited

U.S. PATENT DOCUMENTS

| 8,075,799 B2 | 12/2011 | Hong et al. |
| 8,469,118 B2 | 6/2013 | Passade-Boupat et al. |
| 8,822,386 B2 | 9/2014 | Quintero et al. |

(Continued)

FOREIGN PATENT DOCUMENTS

| CA | 2906182 | 9/2014 |
| KR | 10-1202740 | 11/2012 |

OTHER PUBLICATIONS

Sun et al. "Ultrasonication-assisted uniform decoration of carbon nanotubes by various particles with controlled size and loading", Carbon, 49, 2011, 4376-4384. Published online Jun. 13, 2011.

(Continued)

*Primary Examiner* — Jane L Stanley
(74) *Attorney, Agent, or Firm* — Oblon, McClelland, Mauer & Neustadt, L.L.P.

(57) ABSTRACT

A nanofluid composed of a base fluid and a solid nanocomposite particle, where the solid nanocomposite particle consists of a carbon nanotube and a metal oxide nanoparticle selected from the group consisting of $Fe_2O_3$, $Al_2O_3$, and CuO. The metal oxide nanoparticle is affixed inside of or to the outer surface of the carbon nanotube, and the solid nanocomposite particle is homogeneously dispersed in the base fluid. The heat transfer and specific heat capacity properties of the nanofluid are measured using differential scanning calorimetry and heat exchanger experiments with different nanocomposite concentrations and different metal oxide percent loadings.

8 Claims, 54 Drawing Sheets

(56) References Cited

U.S. PATENT DOCUMENTS

2014/0377790 A1    12/2014   Ramaprabhu
2016/0045882 A1    2/2016    Coulombe et al.

OTHER PUBLICATIONS

Abbasi et al. "The effect of functionalization method on the stability and the thermal conductivity of nanofluid hybrids of carbon nanotubes/gamma alumina", Ceramics International. 39, 2013, 3885-3891. Published online Nov. 23, 2012.

Jha, et al., "Synthesis and thermal conductivity of copper nanoparticle decorated multiwalled carbon nanotube based nanofluids", J. Phys. Chem. C, 2008, 112, 9315-9319. Published online Jun. 4, 2008 (Year:2008).

Martis, et al., "Infrared Irradation controlled decoration of multiwalled carbon nanotubes with copper/copper oxide nanocrystals", Acta Materialia, 59, 2011, 5040-5047. Published online May 26, 2011 (Year: 2011).

Abbasi, et al., "Microstructural features of nanocomposite of alumina@carbon nanotubes/alumina nanoparticles synthesized by solvothermal method", Ceramics International, 38, 2012, 3991-3996. Published online Jan. 28, 2012 (Year:2012).

Huiquin, et al., "Decoration of carbon nanotubes with Iron oxide", Solid State Chemistry, 179, 2006, 1208-1213. Published online Feb. 7, 2006 (Year:2006).

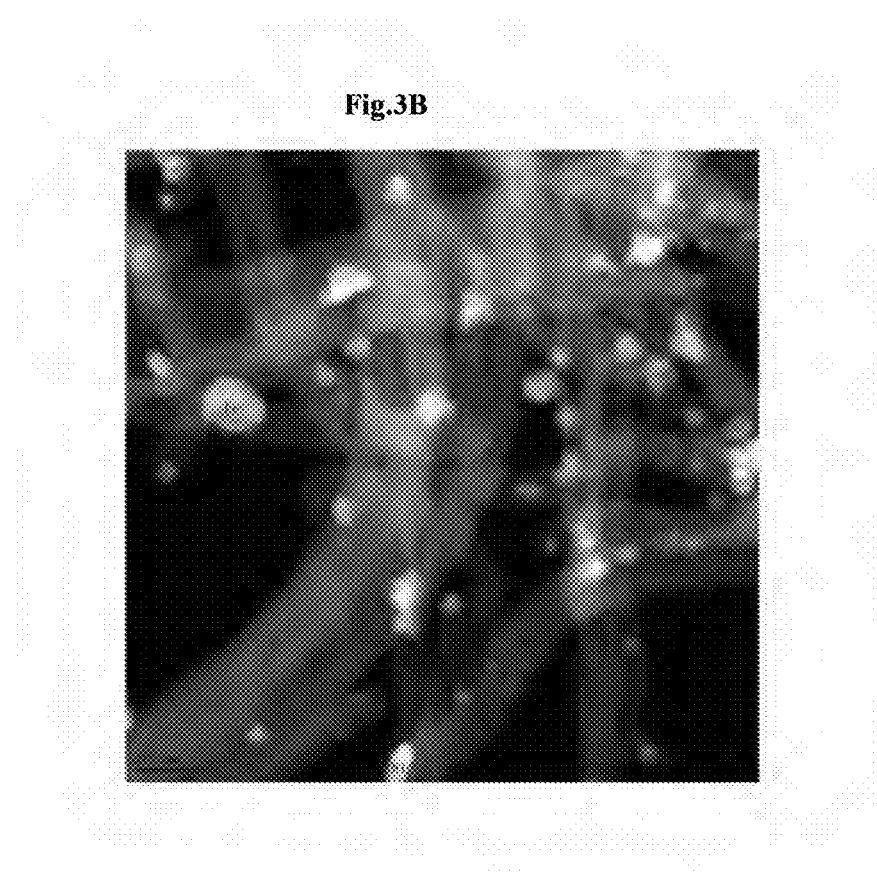

HEAT TRANSFER MEDIUM CONTAINING MULTI-WALL CARBON NANOTUBES

CROSS-REFERENCE TO RELATED APPLICATIONS

The present application is a Continuation of Ser. No. 15/882,413, now allowed, having a filing date of Jan. 29, 2018, which is a Continuation of Ser. No. 14/752,297, now U.S. Pat. No. 9,879,167, having a filing date of Jun. 26, 2015.

BACKGROUND OF THE INVENTION

Technical Field

The present invention relates to a nanofluid containing a carbon nanotube and metal oxide nanoparticle composite and its use for increasing the heat transfer and specific heat capacity of a base fluid. More specifically, the present invention relates to a nanofluid containing a nanocomposite of multi wall carbon nanotubes and iron oxide, aluminum oxide, or copper oxide nanoparticles for increasing the heat transfer and specific heat capacity of water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many industrial and consumer products require the process of heat transfer for continuous operation. Convective heat transfer can be enhanced by changing flow geometry, boundary conditions, or by enhancing the thermal properties of the heat transfer fluid. The heat transfer of fluid is parameters which critically affects the cost and size of heat transfer systems. Conventional fluids like water and oils have limited heat transfer potential. Therefore, technologies that can improve a fluid's thermal properties are of great importance. Improved heat transfer fluids would enable better engines in the automotive industry, more efficient machines in the heating, ventilation and air conditioning (HVAC) industry, higher efficiency flux devices in supercomputers, and provide new cancer treatment techniques.

The need for new classes of fluids with enhanced heat transfer capabilities is recognized by many different research groups around the world [J. C. Maxwell, Electricity and Magnetism, third ed., Clarendon, Oxford, 1904; C. W. Sohn, M. M. Chen, "Microconvective thermal conductivity in disperse two phase mixture as observed in a low velocity Couvette flow experiment" J. Heat Transfer, Trans. ASME 103 (1981) 47-51—each incorporated herein by reference in its entirety]. The advances in nanotechnology have made it possible to manufacture metal and metal oxide particles on a nano-dimensional scale. Nanoparticles are new generation materials with potential applications in the heat transfer area [Choi S. U.S. "Nanofluids: a new fluid of scientific research and innovative applications" Heat Transf. Eng. 2008, 29:429—incorporated herein by reference in its entirety]. In 1995 Choi was the first researcher who worked on the application of nanoparticles in fluid heat transfer at the Argonne National Laboratory, USA [Choi, S. U.S. "Enhancing thermal conductivity of fluids with nanoparticles" American Society of Mechanical Engineers, Fluids Engineering Division, Energy Systems Division, Argonne National Laboratory, 231:99—105, 1995—incorporated herein by reference in its entirety]. Choi defined these fluids as "an innovative new class of heat transfer fluids that can be engineered by suspending nanoparticles in conventional heat transfer fluids" and can lead to order-of-magnitude improvements in the thermal conductivity and convective heat transfer properties of traditional base fluids (ethylene glycol, water, oils) [Wenhua, Y., France, D., Choi, S. U.S., Routbort, J. L., "Review and Assessment of Nanofluid Technology for Transportation and Other Applications" Energy Systems Division, Argonne National Laboratory, April 2007—incorporated herein by reference in its entirety]. These heat transfer fluids with suspended ultrafine nanoparticles are dubbed "nanofluids."

Nanofluids are typically engineered by suspending nanoparticles, preferably those possessing higher thermal conductivity, such as carbon, metal and metal oxides, with average sizes below 100 nanometers (nm) in traditional heat transfer fluids, such as water, oil, and ethylene glycol. Dispersants are also commonly added to avoid agglomeration of particles in the fluid, leading to homogeneous mixtures [P. Keblinski, 1. A. Eastman, and D. G. Cahill, "Nanofluids for thermal transport" Materials Today, 2005. 8(6): pp. 36-44; M. Bai, Z. Xu, and J. Lv, "Application of Nanofluids in Engine Cooling System" SAE International, 2008-01-18, 2008; Zhou, D. W. "Heat transfer enhancement of copper nanofluid with acoustic cavitation" Int. J. Heat Mass Transfer 2004, 47, 3109-3117; Ding, Y., Alias, G., Wen, D., Williams R. A. "Heat transfer of aqueous suspensions of carbon nanotubes (CNT nanofluids)" Int. J. Heat Mass Transfer 2006, 49, 240-250—each incorporated herein by reference in its entirety].

Many research groups have focused on the study of nanofluids by incorporating carbon nanotubes (CNTs). Choi and Zhang enhanced the thermal conductivity of engine oil by 160% when only 1 vol. % of carbon nanotubes (CNTs) were added to the oil [S. Choi, Z. Zhang, W. Yu, F. Lockwood, and E. Grulke, "Anomalous thermal conductivity enhancement in nanotube suspensions," Applied Physics Letters, vol. 79, pp. 2252-2254, 2001—incorporated herein by reference in its entirety]. Assael et al demonstrated that CNTs can enhance the thermal conductivity of water [C. F. C. M. J. Assael, I. N. Metaxa, W. A. Wakeham, "Thermal conductivity of suspensions of carbon nanotubes in water" International Journal of Thermophysics vol. 25, pp. 971-985, 2004—incorporated herein by reference in its entirety]. Furthermore, a 38% enhancement in the thermal conductivity of the nanofluid was achieved when 0.6 vol. % of CNTs was added to water as a based fluid with Sodium Dodecyl Sulfate (SDS) as a dispersing agent [M. Assael, I. Metaxa, J. Arvanitidis, D. Christofilos, and C. Lioutas, "Thermal conductivity enhancement in aqueous suspensions of carbon multi-walled and double-walled nanotubes in the presence of two different dispersants" International Journal of Thennophysics, vol. 26, pp. 647-664, 2005—incorporated herein by reference in its entirety].

In 2005 Liu et al., [M.-S. Liu, M. C.-C. Lin, I.-T. Huang, and C.-C. Wang "Enhancement of thermal conductivity with carbon nanotube for nanofluids," International Communications in Heat and Mass Transfer, vol. 32, pp. 1202-1210, 2005—incorporated herein by reference in its entirety] investigated the thermal conductivities of water mixed with three different types of nanoparticles (CNTs, CuO, $SiO_2$). They reported that a 11.3% improvement of the thermal conductivity was achieved when 0.01% volume of the nanoparticles were added. Ding et al., measured the heat transfer of water mixed with low concentrations of CNTs (0.5-1 vol. %) and an Arabic gum dispersant. Under such conditions, an enormous enhancement in the heat transfer of 350% at Re=800 was obtained [Ding, Y., Alias, H., Wen, D., Williams, R. A.; "Heat Transfer of aqueous suspensions of carbon nanotubes (CNT nanofluids)", International Journal of Heat and Mass Transfer, vol. 49, pp. 240-250, 2006—incorporated herein by reference in its entirety]. In 2007, Koa et al. [Koa, G. H., Heo, K., Lee, K., Kim, D. S., Kim, C., Sohn, Y., Choi, M. "An experimental study on the pressure drop of Nanofluids containing carbon nanotubes in a horizontal tube," International Journal of Heat and Mass Transfer, vol. 50, pp. 4749-4753, 2007—incorporated herein by reference in its entirety] measured the viscosity and the pressure drop characteristics of carbon nanotubes dispersed in water. They observed an increase in the viscosity of the solution due to the suspended solid nanoparticles (CNTs) and a reduction of the pressure drop. Wu et al. [Wu, X., Wu, H., Cheng, P. "Pressure drop and heat transfer of $Al_2O_3$-$H_2O$ nanofluids through silicon microchannels" Journal of Micromechanics and Microengineering, 19(10):105020 (11 pp.), 2009—incorporated herein by reference in its entirety] used alumina nanoparticles dispersed in water at two different concentrations (0.15 and 0.26 vol. %) and performed in laminar flow (Re varied from 190 up to 1020) to measure the heat of the nanofluid. In this experiment, a trapezoidal micro-tube made of silicon was used, heated by a constant DC power supply. The highest increment of the heat transfer was 15.8% for 0.26 vol. %. Using $Al_2O_3$ nanoparticles dispersed in water at laminar conditions using a rectangular microchannel connected with a DC power supply, Ho and his research group, [Ho, C. J., Wei, L. C., Li, Z. W., "An Experimental Investigation of Forced Convective Cooling Performance of a Microchannel Heat Sink with $Al_2O_3$/water nanofluid", Applied Thermal Engineering, 30(2-3):96-103, 2010—incorporated herein by reference in its entirety] observed up to 30% (average value) increases in heat transfer coefficients at 1 vol. % of $Al_2O_3$ nanoparticles and a Reynolds number at 1544. Anoop, et al., [Anoop, K. B., Sundararajan, T., Das, S. K. "Effect of particle size on the convective heat transfer in nanofluid in the developing region" International Journal of Heat and Mass Transfer, 52(9-10) 2009, 2189-2195—incorporated herein by reference in its entirety] studied the effect of different alumina nanoparticles sizes on the heat transfer of water with a Reynolds number from 500 to 2000 and laminar flow. The results showed smaller nanoparticles led increased heat transfer (25%) and thermal conductivity (6%) at a Reynolds number of 1550. The larger nanoparticles raised the heat transfer by only 11%. Mohammed, et al. [Mohammed, H. A., Bhaskaran, G., Shuaib, N. H., Abu-Mulaweh, H. I. "Influence of nanofluids on parallel flow square microchannel heat xchanger performance" International Communications in Heat and Mass Transfer, 38(1) 2011, 1-9—incorporated herein by reference in its entirety] studied the effect of different types of nanoparticles such as silver, silicon dioxide, aluminum oxide and titanium dioxide nanoparticles in the heat transfer of water as nanofluids under laminar flow conditions. In this study, the effect of changing the Reynolds number from 100 to 800 and also the volume fraction of particles at 2%, 5% and 10% was also evaluated. This study demonstrated that silver had the lowest pressure drop and that alumina provided the highest heat transfer coefficient. A recent study conducted by MinSheng Liu et al. in 2011 [MS. Liu, M. C. C. Lin, CC. Wang "Enhancements of thermal conductivities with Cu, CuO, and carbon nanotube nanofluids and application of MWNT/water nanofluid on a water chiller system," Nanoscale Research letters, vol. 6, 2011, p. 297—incorporated herein by reference in its entirety] investigated the enhancement of thermal conductivity of nanofluids prepared by using a two-step method for dispersing copper oxide (CuO) and carbon nanotubes in water, ethylene glycol and synthetic oil without using surfactants. Their results show that nanofluids with low volume concentrations of nanoparticles have the greatest thermal conductivity. A 4.2% increase in cooling capacity of nanofluids at a flow rate of 100 L/min was observed under these conditions. It was also shown that the heat performance coefficient of the water chiller increased by 5.15% relative to that without nanofluids. The researchers also concluded that the dynamic effect (dispersion) may effectively enhance system performance.

While many studies have been conducted on nanofluids containing carbon nanotubes and/or metal oxides, investigations regarding the thermo-physical properties of nanofluids containing impregnated CNTs with metal oxides are scarce.

In view of the forgoing, the objective of the present invention is to provide nanofluids containing carbon nanotubes and metal oxide nanoparticle composites with advantageous thermo-physical properties such as specific heat capacity, viscosity, heat transfer rate and pressure drop.

BRIEF SUMMARY OF THE INVENTION

According to a first aspect, the present invention relates to a nanofluid comprising an aqueous or non-aqueous base fluid and a solid nanocomposite particle. The solid nanocomposite particle contains a carbon nanotube and a metal oxide nanoparticle preferably selected from the group consisting of $Fe_2O_3$, $Al_2O_3$, and CuO, wherein the metal oxide nanoparticle is affixed inside of or to the outer surface of the carbon nanotube. The nanofluid is a colloid wherein the solid nanocomposite particles are homogeneously dispersed in the base fluid.

In a preferred embodiment, the base fluid is water.

In one embodiment, the metal oxide nanoparticle is affixed to an outer surface of the carbon nanotube.

In one embodiment, the solid nanocomposite particle comprises 0.5-13% metal oxide nanoparticles by weight based on the total weight of the nanocomposite particle.

In one embodiment, the solid nanocomposite particle comprises 0.5-3% metal oxide nanoparticles by weight and the metal oxide nanoparticle is a crystal particle with a longest diameter of 0.5-10 nm.

In one embodiment, the solid nanocomposite particle reaches a maximum % weight loss at 530-570° C. under a thermal degradation condition in an air atmosphere.

In one embodiment, the solid nanocomposite particle comprises 7-13% metal oxide nanoparticles by weight and the metal oxide nanoparticle is a crystal particle with a longest diameter of 1-20 nm.

In one embodiment, the solid nanocomposite particle reaches a maximum % weight loss at 480-520° C. under a thermal degradation condition in an air atmosphere.

In one embodiment, the carbon nanotube is a multi-walled carbon nanotube.

In one embodiment, the carbon nanotube has a greatest outer diameter of 10-50 nm.

In one embodiment, the carbon nanotube has a greatest length of 5-35 um.

In one embodiment, the nanofluid comprises 0.005-0.15% solid nanocomposite particles by weight based on the total weight of the nanofluid.

In one embodiment, the kinematic viscosity of the nanofluid is 1-13% greater than the base fluid at temperatures ranging from 25–65° C.

In one embodiment, the nanofluid does not contain a surfactant.

According to second aspect, the present invention relates to a method of increasing the specific heat capacity and heat transfer of water by mixing the nanofluid herein, in one or more of its embodiments, with water, wherein the solid nanocomposite particles comprise 0.5-13% metal oxide nanoparticles and 0.005-0.15% of the total weight of the nanofluid.

In one embodiment, the solid nanocomposite particles comprise 0.5-3% metal oxide nanoparticles and 0.05-0.15% of the total weight of the nanofluid, and the mixing increases the specific heat capacity of the water 10-35% at 35° C.

In one embodiment, the solid nanocomposite particles comprise 7-13% metal oxide nanoparticles and 0.05-0.15% of the total weight of the nanofluid, and the mixing increases the specific heat capacity of the water 30-53% at 35° C.

In one embodiment, the solid nanocomposite particles comprise 0.5-3% metal oxide nanoparticles and 0.05-0.15% of the total weight of the nanofluid, and the mixing increases the heat transfer of the water 20-46% at 35° C.

In one embodiment, the solid nanocomposite particles comprise 7-13% metal oxide nanoparticles and 0.05-0.15% of the total weight of the nanofluid, and the mixing increases the heat transfer of the water 40-70% at 35° C.

In one embodiment, the mixing does not cause a pressure drop of the water.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3B is a back scattering FE-SEM image for 10 wt. % of iron oxide nanoparticles doped on the surface of CNTs.

DETAILED DESCRIPTION OF THE EMBODIMENTS

Figure 1:
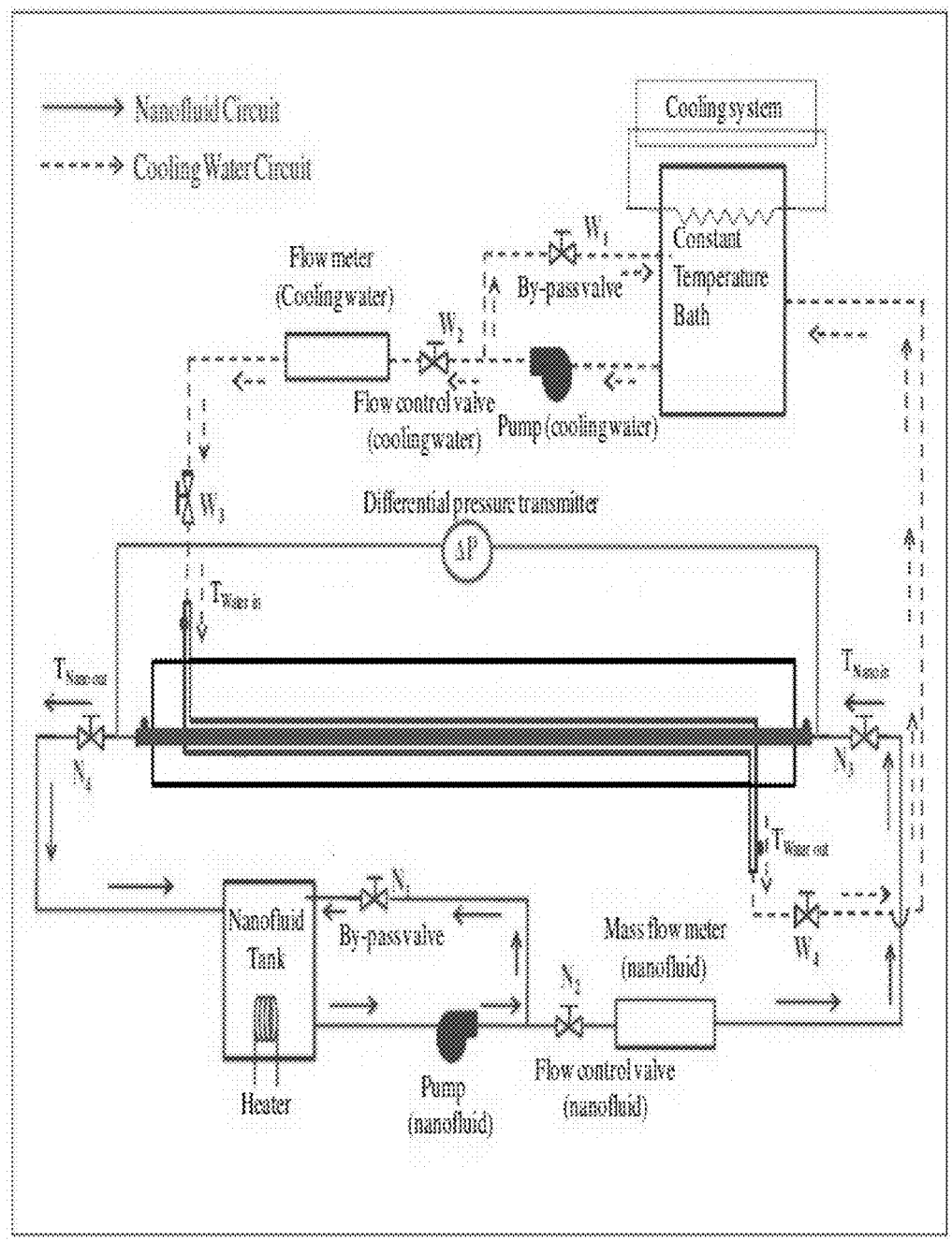
FIG. 1 is an illustration of the shell and tube heat exchanger for measuring heat transfer rates of various fluids.

Referring now to the drawings.

The present invention relates to a nanofluid containing a carbon nanotube and metal oxide nanoparticle composite, the preparation thereof, and its use for increasing the heat transfer and specific heat capacity of base fluid.

A Nanofluid is a fluid containing nanometer-sized particles, called nanoparticles, which are typically between 1-100 nm in size. These fluids are engineered colloidal suspensions of nanoparticles in a base fluid. The nanoparticles used in nanofluids are typically made of metals, oxides, carbides, or carbon nanotubes. Common base fluids include, but are not limited to, water, ethylene glycol, and oil. Nanofluids have novel properties that make them useful in many heat transfer applications, including microelectronics, fuel cells, pharmaceutical processes, engine cooling/vehicle thermal management, domestic refrigerators, chillers, and other heat exchangers. Nanofluids exhibit enhanced thermal conductivity and the convective heat transfer coefficient compared to the base fluid without the nanoparticles. Nanoparticles have unique properties, such as large surface area to volume ratio, dimension-dependent physical properties, and lower kinetic energy, which can be exploited by the nanofluids. At the same time, the large surface area make nanoparticles better and more stably dispersed in base fluids. Compared with micro-fluids or milli-fluids, nanofluids are stable. Nanofluids maintain the fluidic properties of the base fluids, behave like pure liquids and incur little penalty in pressure drop due to the fact that the dispersed phase (nanoparticles) are extremely small.

A nanocomposite is a multiphase solid material where one of the phases has one, two or three dimensions of less than 100 nanometers, or structures having nano-scale repeat distances between the different phases that make up the material. In the broadest sense this definition can include porous media, colloids, gels and copolymers, but is more usually taken to mean the solid combination of a bulk matrix and a nano-dimensional phase differing in properties due to dissimilarities in structure and chemistry. In general, the mechanical, electrical, thermal, optical, electrochemical, catalytic properties of the nanocomposite will differ from that of the component materials.

According to a first aspect, the present invention relates to a nanofluid comprising an aqueous or non-aqueous base fluid and a solid nanocomposite particle. The solid nanocomposite particle contains a carbon nanotube and a metal oxide nanoparticle preferably selected from the group consisting of $Fe_2O_3$, $Al_2O_3$, and CuO, wherein the metal oxide nanoparticle is affixed inside of or to the outer surface of the carbon nanotube. The metal oxide nanoparticles may be affixed to carbon nanotubes in any reasonable manner, such as affixed to the surface of the nanotube or alternately, at least partially embedded within the tubular cavity of the carbon nanostructure. In one embodiment, the metal oxide nanoparticle is affixed to an outer surface of the carbon nanotube.

The nanocomposite of the present invention may be synthesized using, but not limited to, a sol-gel process. In one embodiment, the sol-gel process is an incipient wetness impregnation technique.

A colloid is a substance in which microscopically dispersed insoluble particles are suspended throughout another substance. The nanofluid of the present invention is a colloid wherein the solid nanocomposite particles are homogeneously dispersed in the base fluid. In a preferred embodiment, the base fluid is water.

Iron oxides are widespread in nature, play an important role in many geological and biological processes, and are widely used by humans. Iron(III) oxide, $Fe_2O_3$, can exist in several polymorphs, including α-$Fe_2O_3$, β-$Fe_2O_3$, γ-$Fe_2O_3$, and ε-$Fe_2O_3$ phases. In the present invention, $Fe_2O_3$ may refer to any of these polymorphs, or combinations thereof.

Aluminum oxide, also referred to as alumina, aloxide, aloxite, or alundum is most commonly used to produce aluminum metal. The most common crystalline polymorphic phase is α-$Al_2O_3$, or corundum, and is the most thermodynamically stable form of aluminum oxide. $Al_2O_3$ can also exist in other polymorphs, including γ-$Al_2O_3$, η-$Al_2O_3$, θ-$Al_2O_3$, χ-$Al_2O_3$, κ-$Al_2O_3$, and δ-$Al_2O_3$. In the present invention, $Al_2O_3$ may refer to any of these polymorphs, or combinations thereof.

Copper (II) oxide (CuO) is the higher oxide of copper, and as a mineral is known as tenorite. CuO belongs to the monoclinic crystal system, with the copper atom being coordinated by 4 oxygen atoms in an approximately square planar configuration.

In addition to $Fe_2O_3$, $Al_2O_3$, and CuO, it is envisaged that the present invention may be adapted to incorporate other metal oxide nanoparticles as a part of the nanocomposite for making a nanofluid with improved heat transfer and heat capacity properties. Examples of other metal oxides include, but are not limited to, oxides of magnesium, zirconium, titanium, vanadium, nickel, rhodium, rhenium, silicon, molybdenum, thorium, chromium, manganese, cerium, silver, lead, cadmium, calcium, antimony, tin, bismuth, cobalt, tungsten, and zinc. Further, it may be envisioned that mixtures of metal oxide nanoparticles may be used to construct the nanofluids of the present invention.

In terms of the present invention, the solid nanocomposite particle may comprise 0.5-13% metal oxide nanoparticles by weight based on the total weight of the nanocomposite particle.

In one embodiment, the solid nanocomposite particle comprises 0.5-3%, preferably 0.8-1.5%, more preferably 0.9-1.2% metal oxide nanoparticles by weight. In one embodiment, the metal oxide nanoparticle is a crystal particle with a longest diameter of 0.5-10 nm, preferably 0.8-7 nm, more preferably 1-5 nm. In one embodiment, the solid nanocomposite particle reaches a maximum % weight loss at 530-570° C., preferably 535-565° C., more preferably 545-555° C. under a thermal degradation condition in an air atmosphere.

In one embodiment, the solid nanocomposite particle comprises 7-13%, preferably 8-12%, more preferably 9-11% metal oxide nanoparticles by weight. The metal oxide nanoparticle is a crystal particle with an average longest diameter of 1-20 nm, preferably 1-16 nm, more preferably 1-15 nm. In one embodiment, the solid nanocomposite particle reaches a maximum % weight loss at 480-520° C., preferably 490-515° C., more preferably 495-510° C. under a thermal degradation condition in an air atmosphere.

In terms of the present invention, carbon nanotubes (CNTs) are allotropes of carbon with a cylindrical nanostructure. These cylindrical carbon molecules have unusual properties, which are valuable for nanotechnology, electronics, optics and other fields of materials science and technology. In particular, owing to their extraordinary thermal conductivity and mechanical and electrical properties, carbon nanotubes find applications as additives to various structural materials. Nanotubes are members of the fullerene structural family. Their name is derived from their long, hollow structure with the walls formed by one-atom-thick sheets of carbon, called graphene. These sheets are rolled at specific and discrete ("chiral") angles, and the combination of the rolling angle and radius decides the nanotube properties. Nanotubes are categorized as single-walled nanotubes and multi-walled nanotubes. Most single-walled nanotubes have a diameter of close to 1 nanometer, with a tube length that can be many millions of times longer. The structure of a single-walled nanotube can be conceptualized by wrapping a one-atom-thick layer of graphite called graphene into a seamless cylinder. Alternatively, multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper.

In one embodiment, the carbon nanotube is a multi-walled carbon nanotube. The multi-walled nanotube can adopt the Russian Doll model or the parchment model, or mixtures thereof. In one embodiment, the carbon nanotube has a greatest outer diameter of 10-50 nm, preferably 15-45 nm, more preferably 20-40 nm. In one embodiment, the carbon nanotube has a greatest length of 5-35 μm, preferably 7-33 μm, more preferably 10-30 μm.

In one embodiment, the carbon nanotubes of the present invention do not contain reactive functional groups located on the surface of the nanotube. In an alternative embodiment, the nanotube may contain reactive functional groups located on the surface of the nanotube. Examples of the reactive functional groups may be, but are not limited to, alcohols, carboxylic acids or carboxy derivatives, aldehydes, ketones, amines, etc.

In one embodiment, the nanofluid comprises 0.005-0.15%, preferably 0.008-0.13%, more preferably 0.01-0.10% solid nanocomposite particles by weight based on the total weight of the nanofluid.

In one embodiment, the kinematic viscosity of the nanofluid is 1-13%, preferably 2-12%, more preferably 3-11% greater than the base fluid at temperatures ranging from 25–65° C. In terms of the present invention, the kinematic viscosity of the nanofluid increases relative to water as the base fluid.

Surfactants are compounds that lower the surface tension (or interfacial tension) between two liquids or between a liquid and a solid. Surfactants may act as detergents, wetting agents, emulsifiers, foaming agents, and dispersants. Surfactants are common components in nanofluids used in a variety of applications in order to better disperse the solid particles in the base fluid, thus improving the properties of the nanofluid. The surfactants may also make the dispersion easier to process. Surfactants may also stabilize the dispersions by inhibiting crystallization or precipitation of the nanocomposites. Suitable surfactants include amphoteric, cationic, anionic, and nonionic surfactants. Examples of surfactants include ammonium lauryl sulfate, sodium lauryl sulfate (SDS, sodium dodecyl sulfate), sodium lauryl ether sulfate, sodium myreth sulfate, dioctyl sodium sulfosuccinate, perfluorooctanesulfonate, perfluorobutanesulfonate, sodium stearate, sodium lauroyl sarcosinate, perfluorononanoate, perfluorooctanoate, octenidine dihydrochloride, cetyl trimethylammonium bromide (CTAB), cetyl trimethylammonium chloride, cetylpyridinium chloride, benzalkonium chloride, Benzethonium chloride, 5-Bromo-5-nitro-1,3-dioxane, dimethyldioctadecylammonium chloride, cetrimonium bromide, dioctadecyldimethylammonium bromide, cocamidopropyl hydroxysultaine, cocamidopropyl betaine, phosphatidylserine, phosphatidylethanolamine, phosphatidylcholine, sphingomyelins, octaethylene glycol monododecyl ether, pentaethylene glycol monododecyl ether, decyl glucoside, lauryl glucoside, octyl glucoside, Triton X-100, Nonoxynol-9, glyceryl laurate, dodecyldimethylamine oxide, poloxamers, vinyl polymers and copolymers having substituents that are hydroxy, alkyl, acyloxy, and cyclic amides, polyvinyl alcohol-polyvinyl acetate copolymers, polyvinylpyrrolidone, polyethylene polyvinyl alcohol copolymers, and polyvinylpyrrolidone-polyvinyl acetate copolymers.

In one embodiment, the nanofluid may comprise a surfactant.

In an alternative embodiment, the nanofluid does not contain a surfactant. In such a scenario, the nanocomposite may be dispersed in a base medium using a dispersion method (sonication, etc.), by the inherent agglomeration prevention properties of the nanocomposites themselves (i.e. the presence of the metal oxide nanoparticles on the surface of the nanocomposite, etc.), or both.

The nanofluid of the present invention may contain other additives, which are added to change the properties of the nanofluid. In addition to a surfactant, one or more additives may include, but are not limited to, an antifoaming agent or defoamer, a scale inhibitor, a corrosion inhibitor, a colorant, a thermal stabilizer, and a coolant additive.

Exemplary antifoam agents include polydimethylsiloxane emulsion based antifoams. They include PC-5450NF from Performance Chemicals, LLC in Boscawen, N. H.; CNC antifoam XD-55 NF and XD-56 from CNC International in Woonsocket in RI. Other antifoams suitable for use in the present invention include copolymers of ethylene oxide and propylene oxide, such as Pluronic L-61 from BASF. Generally, the optional antifoam agents may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acid or fatty acid ester (e.g., stearic acid, and the like); a fatty alcohol, an alkoxylated alcohol and a polyglycol; a polyether polylol acetate, a polyether ethoxylated sorbital hexaoleate, and a poly(ethylene oxide-propylene oxide)monoallyl ether acetate; a wax, a naphtha, kerosene and an aromatic oil; and combinations comprising one or more of the foregoing antifoam agents.

Exemplary scale inhibitors include phosphonates, acrylic co/ter-polymers, polyacrylic acid (PAA), phosphino carboxylic acid (PPCA), and phosphate esters. These include 1-Hydroxyethane-1,-diphosphonic acid (HEDP), Aminotri (methylenephosphonic acid) (ATMP), diethylenetriamine-penta (methylenephosphonic acid) (DETPMP), 2-Hydroxyethyliminobis (methylenephosphonic acid) (HEBMP), polyacrylates, phosphonomethylated amines, and polyphosphonic acids and derivatives thereof and salts thereof or other traditional aqueous-based scale inhibitor chemistries. Suitable scale inhibitors will be known to those of skill in the art.

The freezing point depressant can be an alcohol or mixture of alcohols. Exemplary alcohols include monohydric or polyhydric alcohols and mixtures thereof. The alcohol can be selected from the group consisting of methanol, ethanol, propanol, butanol, furfurol, furfuryl alcohol, tetrahydrofurfuryl alcohol, ethoxylated furfuryl alcohol, ethylene glycol, propylene glycol, 1,3-propanediol, glycerol, diethylene glycol, triethylene glycol, 1,2-propylene glycol, 1,3-propylene glycol, dipropylene glycol, butylene glycol, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol, and combinations of two or more of the foregoing.

Further, salts additives may be added to the nanofluid. Exemplary salts include mineral well or oil well brine or chlorides such as calcium chloride, magnesium chloride, potassium chloride, sodium chloride or acetates.

Exemplary corrosion inhibitors include triazoles, such as tolyl triazole and benzotriazole, aspartic acid, sebacic acid, borax, molybdates, such as molybdic oxide and sodium molybdate dihydrate, nitrites, amine-based compounds such as ethylene diamine, propylene diamine, morpholine, or a combination of two or more thereof.

Thermal stabilizers include, but are not limited to, tetra (2-hydroxypropyl) ethylenediamine (also known as quadrol polyol), polyethyleneglycol, and pentaerythritol.

According to second aspect, the present invention relates to a method of increasing the specific heat capacity and heat transfer of water by mixing the nanofluid herein in one or more of its embodiments, with water, wherein the solid nanocomposite particles comprise 0.5-13% metal oxide nanoparticles by weight, and 0.005-0.15% of the total weight of the nanofluid.

Heat capacity is a measurable physical quantity equal to the ratio of the heat added to (or subtracted from) an object to the resulting temperature change. Heat capacity is an extensive property of matter, meaning it is proportional to the size of the system. When expressing the same phenomenon as an intensive property, the heat capacity is divided by the amount of substance, mass, or volume, so that the quantity is independent of the size or extent of the sample. The specific heat capacity, therefore, is the heat capacity per unit mass of a material. Temperature reflects the average randomized energy of constituent particles of matter (e.g. atoms or molecules), while heat is the transfer of thermal energy across a system boundary into the body or from the body to the environment. Translation, rotation, and a combination of the two types of energy in the vibration (kinetic and potential) of atoms represent the degrees of freedom of motion which classically contribute to the heat capacity of matter. On a microscopic scale, each system particle absorbs thermal energy among the few degrees of freedom available to it, and at sufficient temperatures, this process contributes to the specific heat capacity.

One way to measure the specific heat capacity is by calorimetry. Calorimetry involves the experimental quantification of heat released in a chemical process, either a reaction or a conformational alteration. Calorimetry uses a closed system, which is a system separated from its surroundings by some boundary, through which heat and energy but not mass are able to flow. Calorimetry may be conducted at either constant pressure or volume and allows one to monitor the change in temperature as a result of the chemical process being investigated. Differential scanning calorimetry (DSC) is a specific type of calorimetry including both a sample substance and a reference substance, residing in separate chambers. While the reference chamber contains only a reference substance, the sample chamber contains an equal amount of the same reference substance in addition to the substance of interest. DSC is therefore a thermoanalytical technique in which the difference in the amount of heat required to increase the temperature of a sample and a reference sample is measured as a function of temperature. Both the sample and reference are maintained at nearly the same temperature throughout the experiment. The reference sample should have a well-defined heat capacity over the range of temperatures to be scanned. The basic principle underlying this technique is that when the sample undergoes a physical transformation or transition, more or less heat will need to flow to it than the reference to maintain both at the same temperature. By observing the difference in heat flow between the sample and reference, differential scanning calorimeters are able to measure the amount of heat absorbed or released during such transitions. Since most materials exhibit some type of transition as a function of temperature, DSC may be used to observe subtle physical changes, such as glass transitions, fusions, and crystallization events. In one embodiment, the DSC technique utilized in the present invention is a dynamic DSC technique, which is a technique that measures the heat of reaction as a function of a linear thermal response. Therefore, the heat flow of the sample and reference are typically monitored across a varying temperature range, and the temperature is usually varied linearly at a fixed rate. Generally, the temperature program for a dynamic DSC analysis is designed such that the sample holder temperature increases linearly as a function of time. Unlike dynamic DSC, isothermal DSC is a technique where isothermal scanning is accomplished by fixing the temperature for both the sample and the reference. In isothermal DSC, the sample and reference are typically preheated to a reaction temperature under an inert atmosphere, then switched to the reaction atmosphere and any heat flow changes are observed as a deviation from the baseline value at a constant temperature. In is envisioned that the DSC technique utilized in the present invention may be adapted for an isothermal differential scanning calorimetry technique.

In one embodiment, the solid nanocomposite particles comprise 0.5-3%, preferably 0.8-1.5%, more preferably 0.9-1.2% metal oxide nanoparticles by weight, and 0.05-0.15% by weight based on the total weight of the nanofluid, and the mixing increases the specific heat capacity of the water 10-35%, preferably 15-34%, more preferably 18-33% at 35° C. Referring now to the above mentioned wt. %. When the metal oxide is $Fe_2O_3$, the mixing increases the specific heat capacity of water by 15-25%, preferably 18-20%. When the metal oxide is $Al_2O_3$, the mixing increases the specific heat capacity of water by 25-33%, preferably 30-34%. When the metal oxide is CuO, the mixing increases the specific heat capacity of water by 15-25%, preferably 18-22%.

In one embodiment, the solid nanocomposite particles comprise 7-13%, preferably 8-12%, more preferably 9-11% metal oxide nanoparticles by weight, and 0.05-0.15% by weight based on the total weight of the nanofluid, and the mixing increases the specific heat capacity of the water 30-53%, preferably 35-52%, more preferably 36-51% at 35° C. Referring now to the above mentioned wt. %. When the metal oxide is $Fe_2O_3$, the mixing increases the specific heat capacity of water by 32-45%, preferably 36-42%. When the metal oxide is $Al_2O_3$, the mixing increases the specific heat capacity of water by 45-53%, preferably 48-51%. When the metal oxide is CuO, the mixing increases the specific heat capacity of water by 45-53%, preferably 47-51%.

Heat transfer describes the exchange of thermal energy, between physical systems depending on the temperature and pressure, by dissipating heat. The fundamental modes of heat transfer are conduction or diffusion, convection and radiation. In terms of the present disclosure, heat transfer can be described as the exchange of kinetic energy of particles through the boundary between two systems which are at different temperatures from each other or from their surroundings. Therefore, the addition of nanoparticles into a base fluid can directly impact the specific heat capacity and heat transfer properties of the base fluid.

In terms of the present invention, the heat transfer of the nanofluids was measured using a shell and tube heat exchanger. An example diagram of a shell and tube heat exchanger is depicted in FIG. 1. A shell and tube heat exchanger is a class of heat exchanger designs. It is the most common type of heat exchanger in oil refineries and other large chemical processes, and is suited for higher-pressure applications. This type of heat exchanger consists of a shell (a large pressure vessel) with a bundle of tubes inside it. One fluid runs through the tubes, and another fluid flows over the tubes (through the shell) to transfer heat between the two fluids. The set of tubes is called a tube bundle, and may be composed of several types of tubes: plain, longitudinally finned, etc. Tube and shell heat exchangers may be based on several designs, including U-tube heat exchangers, straight-tube heat exchangers with a one pass tube side, and straight-tube heat exchangers with a two pass tube side. To be able to transfer heat well, the tube material should have good thermal conductivity. Because heat is transferred from a hot to a cold side through the tubes, there is a temperature difference through the width of the tubes. Because of the tendency of the tube material to thermally expand differently at various temperatures, thermal stresses occur during operation. This is in addition to any stress from high pressures from the fluids themselves. The tube material also should be compatible with both the shell and tube side fluids for long periods under the operating conditions (temperatures, pressures, pH, etc.) to minimize corrosion.

In one embodiment, the solid nanocomposite particles comprise 0.5-3%, preferably 0.7-1.5%, more preferably 0.9-1.2% metal oxide nanoparticles by weight, and 0.05-0.15% by weight of the total weight of the nanofluid, and the mixing increases the heat transfer of the water 20-46%, preferably 21-45%, more preferably 22-44% at 35° C. Referring now to the above mentioned wt. %. When the metal oxide is $Fe_2O_3$, the mixing increases the heat transfer of water by 25-35%, preferably 28-32%. When the metal oxide is $Al_2O_3$, the mixing increases the heat transfer of water by 40-46%, preferably 43-45%. When the metal oxide is CuO, the mixing increases the heat transfer of water by 20-30%, preferably 22-25%.

In one embodiment, the solid nanocomposite particles comprise 7-13%, preferably 8-12%, more preferably 9-11% metal oxide nanoparticles by weight, and 0.05-0.15% by weight of the total weight of the nanofluid, and the mixing increases the heat transfer of the water 40-70%, preferably 50-65%, more preferably 55-63% at 35° C. Referring now to the above mentioned wt. %. When the metal oxide is $Fe_2O_3$, the mixing increases the heat transfer of water by 55-63%, preferably 58-61%. When the metal oxide is $Al_2O_3$, the mixing increases the heat transfer of water by 52-62%, preferably 55-60%. When the metal oxide is CuO, the mixing increases the heat transfer of water by 53-62%, preferably 56-61%.

In one embodiment, the mixing does not cause a pressure drop of the water.

The examples below are intended to further illustrate protocols for preparing and characterizing the nanofluids comprising metal oxide doped CNTs, and the uses thereof, and are not intended to limit the scope of the claims.

Example 1

Materials

Multi-walled carbon nanotubes (MWCNTs) were supplied from Chengdu Organic Chemicals Co. Ltd., China, which has the following specifications: 10 to 20 nm outer diameter, length from 10 to 30 μm with 200 $m^2$/g specific surface areas and a 95% purity. Ferric nitrate $Fe(NO_3)_3.9H_2O$ (99% purity) as precursor for iron oxide nanoparticles was supplied from Sigma and Aldrich Co.

Example 2

Impregnation of CNTs with Metal Oxide Nanoparticles Using Incipient Wetness Impregnation (IWI)

The impregnation process is widely used for developing heterogeneous catalysts. It is an aqueous sol-gel process which converts a precursor solution to an inorganic solid through inorganic polymerization reactions with water. This process involves the impregnation of support material with inorganic salts having the metal deposited for preparation in a homogeneous solution in water, followed by a reduction step for conversion of this solution into a sol by treatment using water. During the impregnation method, metal ions are adsorbed to the surface of CNTs by homogeneously mixing CNTs with the metal precursors in a solution. The thermal treatment process was carried out under high temperature to crack the metal. The metal oxide nanoparticles catalyst was prepared by the sol-gel method. The precursor used for the $Fe_2O_3$-CNTs was ferric nitrate $Fe(NO_3)_3.9H_2O$ with 99.9% purity. The metal salt was impressed in alcohol at different concentration in order to impregnate the surface of MCNTs with various percentage loads (1 and 10%). The impregnation was done under ultrasonic condition for 30 minutes at room temperature. The aim of the ultrasonication process is to have a completed and homogeneous wetting of the all sample particles during impregnation. Then the reaction was followed by a calcination process at high temperature (350° C.) for 3.5 hours, during which adsorption introduced metallic nanoparticles into the MWCNT matrix. Finally, multiwalled carbon nanotubes impregnated with iron oxide nanoparticles were formed. The impregnated CNTs with iron oxide were characterized using scanning electron microscopy (SEM) attached with energy Dispersive X-ray (EDX) to characterize their microstructure and the elemental composition. The imaging was conducted at varying magnifications in secondary electron and backscattering mode utilizing an accelerating voltage of 20.0 keV. The samples should coat with high Conductive gold in order to increase the electrical conductivity before sending to the vacuum chamber of SEM. The impregnated nanoparticles (CNT-$Fe_2O_3$) were also measured with Thermo-Gravimetric Analysis (TGA).

Example 3

Preparation of Nanofluids

The produced nanofluids were prepared by dispersing the raw and impregnated multiwall carbon nanotubes with metal oxide nanoparticles in water using ultrasonic sonication. The ultrasonic method was carried out for 30 minutes using the ultrasonic prop at 100% amplitude, 750 watts power density and frequency-30 kHz to prepare the nanofluids. The purpose of sonication process is to weaken the van der Wals interactions between the particles and disperse them homogenously in solution. Different samples of nanofluids were prepared at 0.01 wt. %, 0.05 wt. % and 0.1 wt. % CNT-metal oxide without using any surfactants or depressants.

Example 4

Measurements of the Specific Heat Capacity of Nanofluids

The most commonly used technique for measuring the specific heat capacity of nanofluids is Differential Scanning calorimetry (DSC). Herein, a Differential Scanning calorimetry, (DSC Q1000, Model TA Instruments, USA), Connected with rapid cooling system, RCS 90 using Nitrogen gas was used. The DSC measurements were taken at the following conditions; equilibrates at 25° C., isotherm for 3 minutes and ramp 1.5° C./min to 50° C. Heat flux measurement was continuous from 25° C. to 50° C. Furthermore, specific heat capacities were plotted with temperature. Three measurements were taken for each sample of nanofluids concentration, and then these values were averaged. In order to measure the specific heat capacity (cp) of nanofluids, the samples were sonicated for 10 minutes and cooled with ice bath to the room temperature immediately before being placed in the DSC.

Example 5

The Viscosity Measurements of Nanofluids

The kinematic viscosity of the nanofluids was measured by using Stormer viscometer. The kinematic viscosity was calculated through measuring the time needed for an inner cylinder to perform 100 revolutions in response to motivating weight. The measurements were taken for temperatures ranging from 25° C. to 65° C. for different mass concentrations of nanofluids.

Example 6

Zetal Potential Measurement of Nanofluids

A Zetasizer Nano series model ZEN2600 was used to measure the Zeta potential of nanofluids at different pH. The zeta-potential was measured to observe the behavior of dispersive nanoparticles in liquids. In addition, the zeta-potential characterizes the electrical double layer on the solid/liquid interface. When a charged particle is suspended in liquid, ions of an opposite charge will be attracted to the surface of the suspended particle. Ions close to the surface of the particle will be strongly bound while ions that are further away will be loosely bound forming; it is called a diffuse layer. A potential occurs between the dispersing liquid and the particle surface which differs according to the distance from the particle surface; this potential at the slipping plane is called the Zeta potential.

Example 7

Experimental System

This system depicted in FIG. 1 was used to investigate the heat transfer rate of nanofluids in a tube and shell heat exchanger in fully PC-controlled equipment. The unit mainly involves of two flow cycles, a heating unit (thermostat) for heating the nanofluids, and a cooling system. One of the flowing loop carries heated nanofluids and another carries cooling water (Chillier). Each flow loop connected with controlled pump with a flow meter; the flow meter can measure flow rate and density for the flowing fluid. Two types of materials were used herein: stainless steel type SS 316Ti and copper, 2980 mm long consisting of 3 tubes. The inside diameter (ID) of tube is 10 mm and the outside diameter (OD) is 14 mm. The design heat transfer area of each tube is 0.38 $m^2$. The tube shell was constructed from borosilicate glass 3.3, which is a material that is used especially in the chemical and pharmaceutical industries because of its almost universal corrosion resistance. In order to measure the inlet and outlet temperatures of each stream, four I-type thermocouples were inserted in the shell and tube sides of heat exchanger. An additional thermocouple was inserted in the nanofluid reservoir. Differential pressure transmitters were installed at both ends of the pipes to measure pressure drop. The cooler tank (chillier) had a 4.6 kW cooling capacity, used to keep the water temperature constant. In 12-liter capacity thermostat tank, a 3.5 kW electric heater was installed to keep the temperature of the nanofluid constant. Experiments were performed on mass flow rates ranging from 200 kg/hr up to 640 kg/hr while the temperature of the inlet tube and shell was fixed at 35 and 20° C. respectively. The fluid attains a steady state condition after about 30 minutes for turbulent flow. Therefore, the inlet and outlet temperatures of tube and shell and the pressure drops of tube side are measured after achieving steady state conditions. From these measurements, the heat transfer enhancement in each tube was calculated as in the following equation:

$$Q = m_n C p_n (T_{n,in} - T_{n,out})$$

Where, Q is heat transfer rate in tube, $m_n$ is the mass flow rate for nanofluids, $Cp_n$ is specific heat capacity of nanofluids, $T_{n,in}$ is tube inlet temperature and $T_{n,out}$ is tube outlet temperature. The schematic diagram of the experimental set up of the shell and tube heat exchanger is shown in FIG. 1.

Example 8

Surface Characterization of Raw and Impregnated CNTs

Figure 2A:
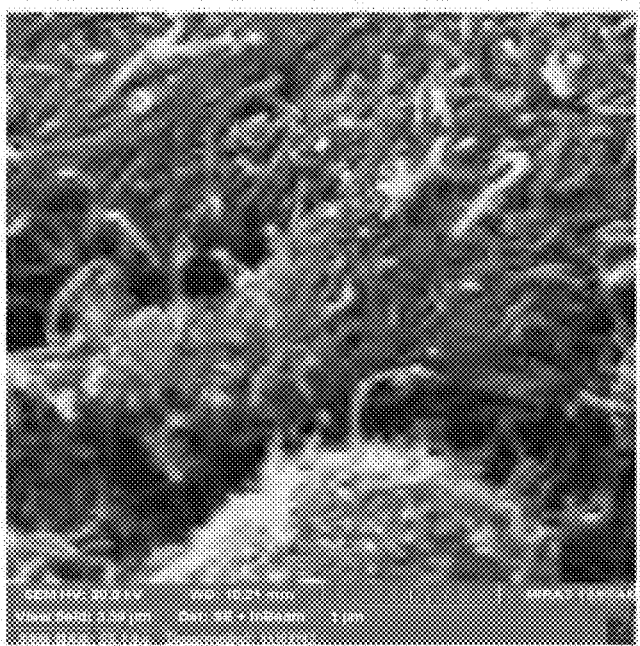
FIG. 2A is a FE-SEM image of low magnification and FIG. 2B is a FE-SEM image of high magnification of CNTs.
Figure 2B:
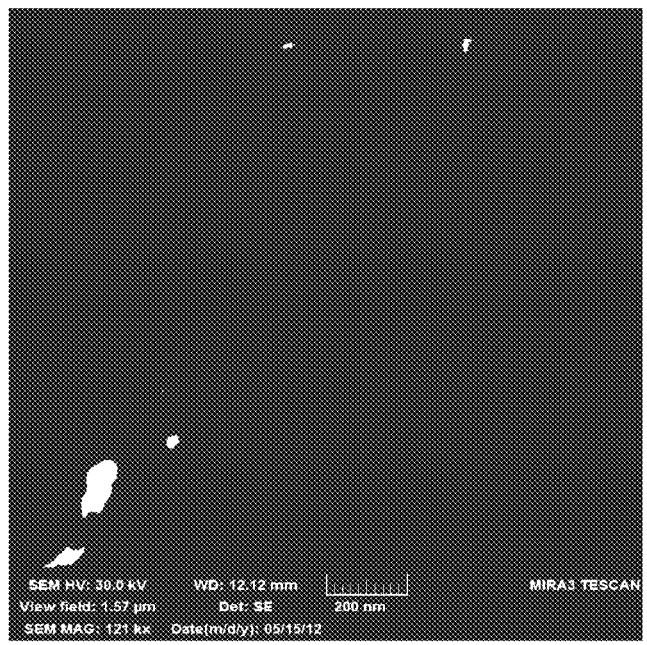
Figure 3A:
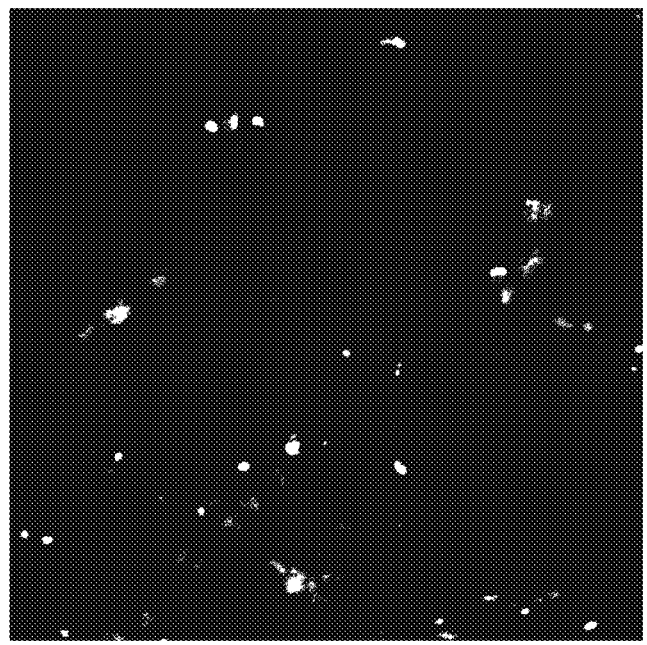
FIG. 3A is a back scattering FE-SEM image for 1 wt. %
Figure 4A:
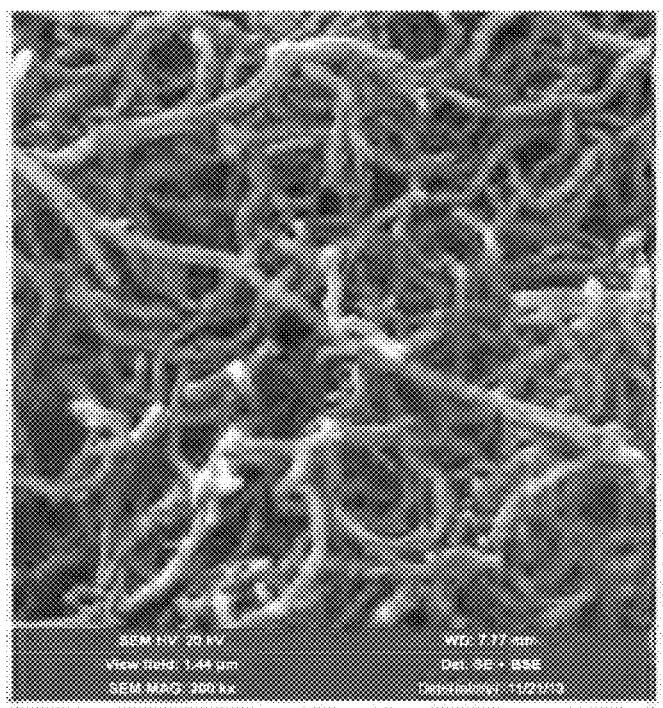
FIG. 4A is a Back scattering FE-SEM image for 1 wt. %
Figure 4B:
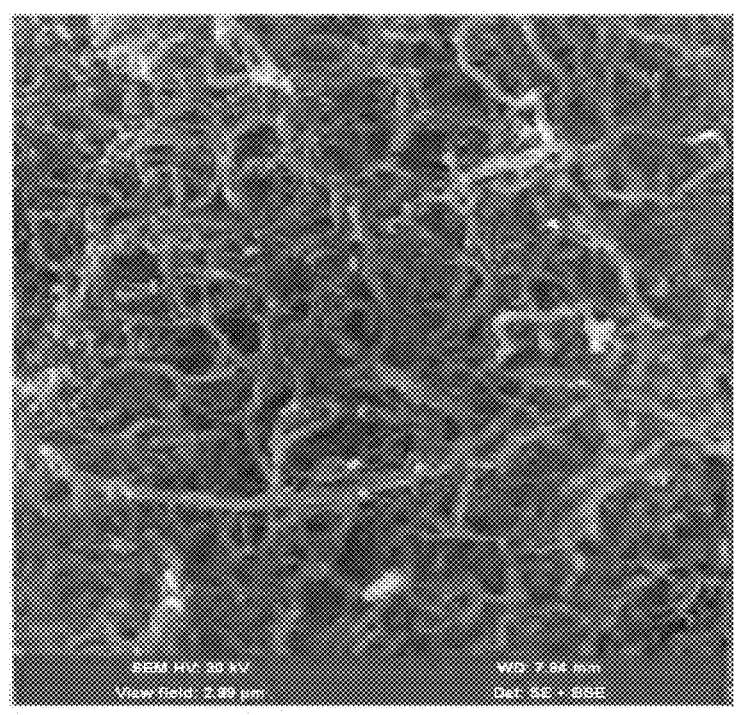
FIG. 4B is a Back scattering FE-SEM image for 10 wt. % of copper oxide nanoparticles doped on the surface of CNTs.

FIG. 2A-B displays the FE-SEM images of low and high magnifications of raw carbon nanotubes. The randomly oriented tubes of MWCNT can be clearly seen. The high magnification image shows the characteristic features of CNTs. The diameters of the CNTs were varying from 20 to 40 nm with an average diameter of 24 nm, while the length of these carbon nanotubes was varying from 10-30 µm. This study was also supported by the characterization of doped CNTs with metal oxide nanoparticles using Back Scattering FE-SEM in order to verify the presence of nanoparticles on the surfaces of the CNTs as shown in FIG. 3A-B for $Fe_2O_3$ and FIG. 4A-B for CuO. The back scattering images were taken for two different samples at 1 and 10 wt. % of $Fe_2O_3$ and CuO nanoparticles doped on CNTs. It was observed that, there are many formations of white crystal structures of metal oxide nanoparticles with small sizes and irregular shapes. The distribution and agglomeration of the metal oxide nanoparticles was also observed. At low concentration metal oxide nanoparticles (1 wt. %), the particles spread widely on the surfaces of carbon nanotubes forming very small crystals particles with diameters varying from 1-5 nm while at high concentration of metal oxide nanoparticles (10 wt. %) the particles agglomerated, forming large crystals nanoparticles with diameters varying from 1-15 nm.

Figure 5A:
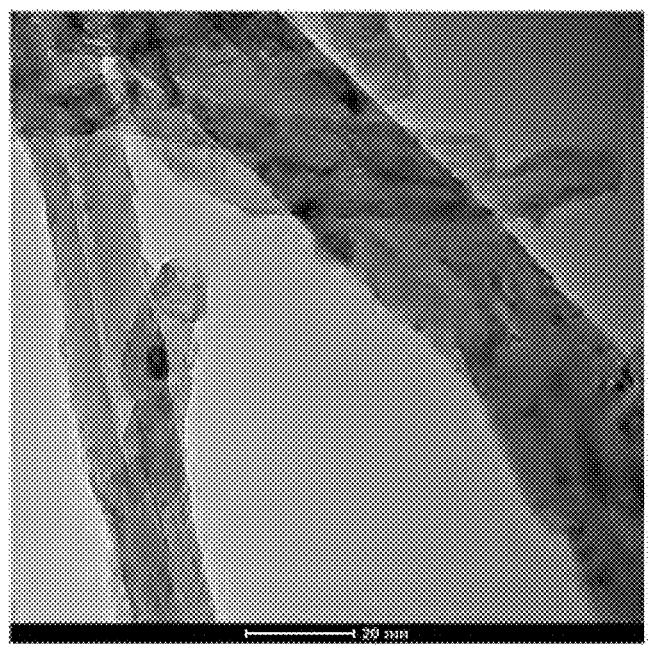
FIG. 5A is a TEM image of MWCNTs and FIG. 5B is a TEM image of CNTs doped with $Fe_2O_3$ nanoparticles.
Figure 5B:
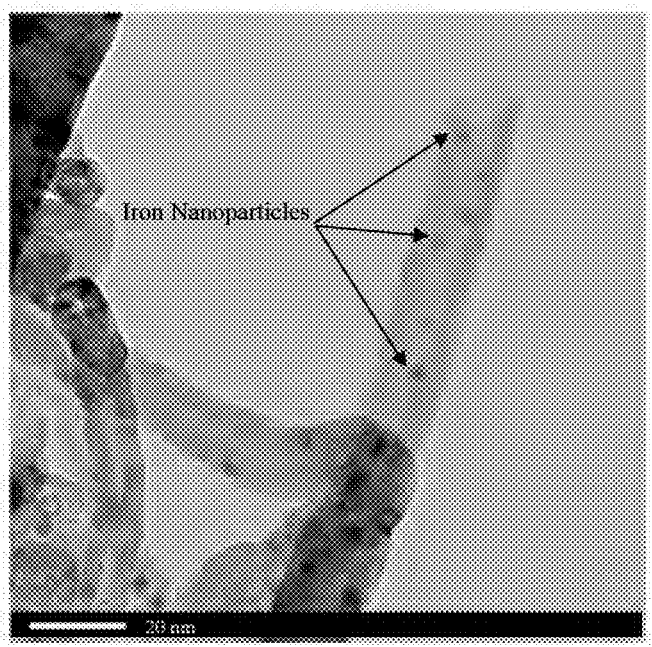

FE-TEM was carried out to characterize the structures of nanotubes and $Fe_2O_3$ nanoparticles, sizes of nanotubes and nanoparticles, and to observe the way of the doping of metal oxide nanoparticles on the surfaces of CNTs. To prepare TEM samples, some alcohol was dropped on the nanotubes film, then, these films were transferred with a pair of tweezers to a carbon-coated copper grid. The TEM image of nanotubes is presented in FIG. 5A. It is obvious from the images that all the nanotubes are hollow and tubular in shape with many deflections sites. In some of the images, catalyst particles can be seen inside the nanotubes. FIG. 5B shows a TEM image of typical decorated CNTs. It was found that the $Fe_2O_3$ nanoparticles cover the surfaces the CNTs with an average particle size ~6 nm which is consistent with back scatter FE-SEM. It was also noticed that, the structure of CNTs is not destroyed during the impregnation of nanoparticles on the surfaces of CNTs.

Figure 6A:
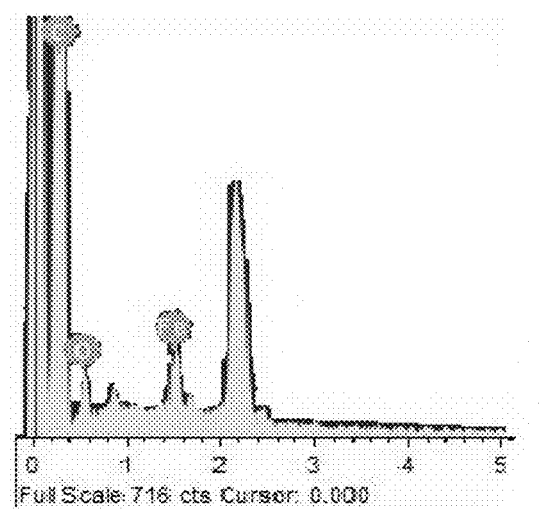
FIG. 6A is the EDX analysis of CNTs doped with 1% iron oxide nanoparticles and FIG. 6B is the EDX analysis of CNTs doped with 10% iron oxide nanoparticles.
Figure 6B:
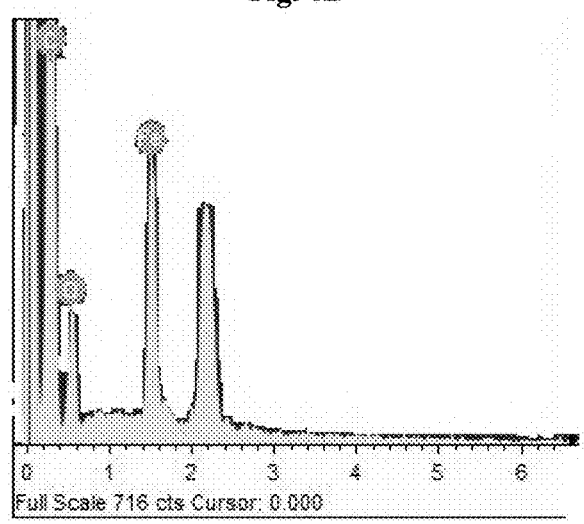

In addition to identify the state of the metal particles on the CNTs, elementary diffraction X-ray EDX analysis has been conducted along with FE-SEM studies. The outcome from this analysis is shown in FIG. 6-8 in which metal particles are confirmed as metal oxide forms. The peaks in FIG. 6 indicate the percentage of iron oxide nanoparticles coated on the surfaces of CNTs. Almost 10% of iron oxide nanoparticles were doped on the surfaces of CNTs while other particles with very low concentrations such silica and alumina are shown in FIG. 6 as impurities attached to CNTs during the production of CNTs.

Figure 7A:
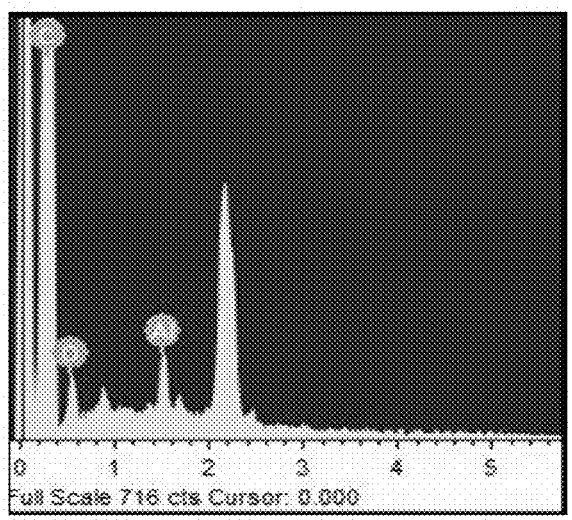
FIG. 7A is an EDS analysis of aluminum oxide doped CNTs with 1 wt. %
Figure 7B:
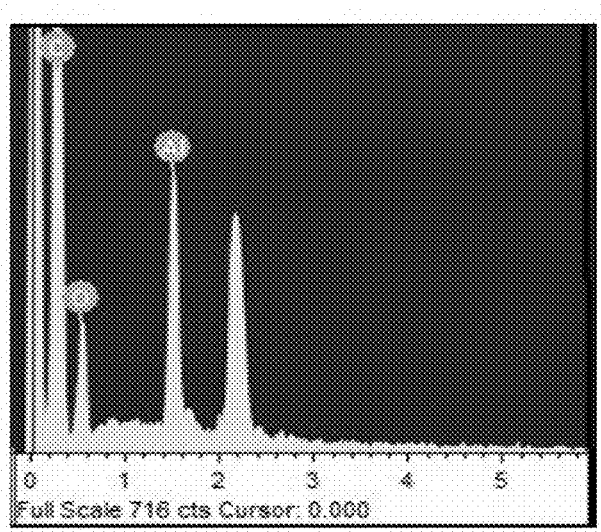
FIG. 7B is an EDS analysis of 10 wt. % of Aluminum oxide nanoparticles doped on the surface of CNTs.
Figure 8A:
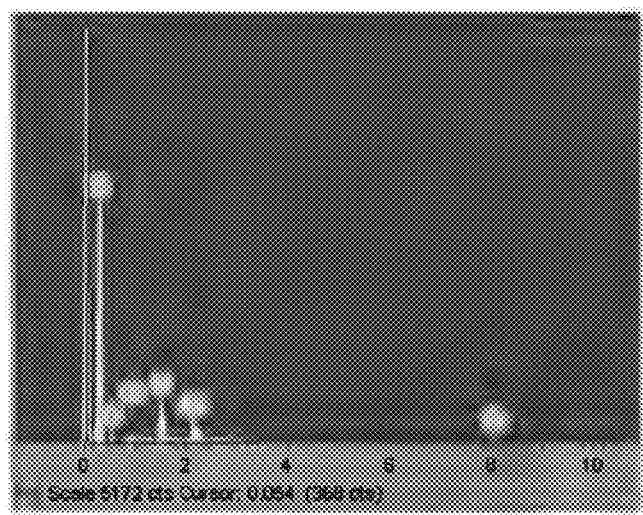
FIG. 8A is an EDS analysis of copper oxide doped CNTs with 1 wt. %
Figure 8B:
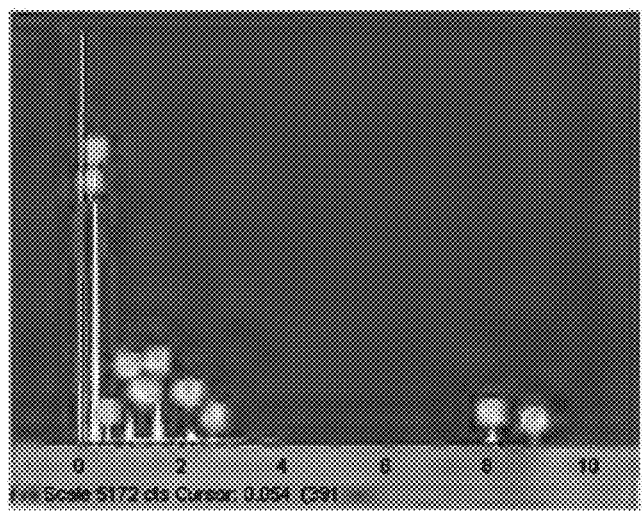
FIG. 8B is an EDS analysis of 10 wt. % copper oxide nanoparticles doped on the surface of CNTs.

FIG. 7 shows the EDX spectrum of 1 wt. % and 10% of doped aluminum oxide on the surface of CNT, in which aluminum particles are confirmed as aluminum forms. The strong peak assign to aluminum element, and indicates that the loading of aluminum nanoparticles onto the MWCNT has an effect on the surface area successfully synthesized using a wet impregnation method. It is clear that the peak in FIG. 7B is higher than that in FIG. 7A, this confirms that 10% of aluminum oxide nanoparticles were doped on the surfaces of CNTs while other particle impurities such silica and alumina are attached to CNTs during the production of CNTs at very low concentrations.

FIG. 8 shows the EDX spectrum of 1 wt. % and 10% of doped copper oxide on the surface of CNT, in which coppers particles are confirmed as copper forms. The strong peak assign to copper element, this indicates that the loading of copper nanoparticles onto the MWCNT has an effect on the surface area successfully synthesized using a wet impregnation method. Almost 10% of copper oxide nanoparticles were doped on the surfaces of CNTs while other particle impurities such silica and alumina are attached to CNTs during the production of CNTs at very low concentrations.

Example 9

Thermal Degradation Analysis

The study of the thermal oxidation of materials is of major importance since it can, in many cases, determine the upper temperature limit of use for a material. In addition, considerable attention has been directed towards the exploitation of thermogravimetric data for the determination of functional groups. For this purpose, thermogravimetric analysis (TGA) and derivative thermogravimetric (DTG) is a technique widely used because of its simplicity and the information afforded by a simple thermogram.

Figure 9A:
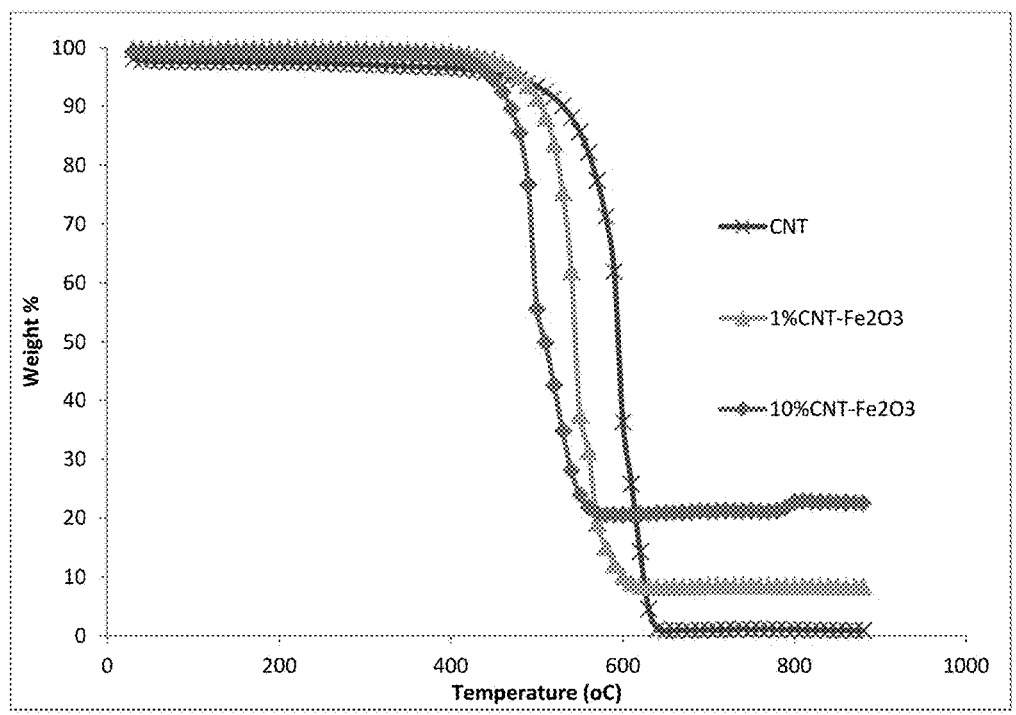
FIG. 9A is a graph illustrating thermogravimetric analysis (TGA) and FIG. 9B is a graph of derivative thermogravimetric analysis (DTG) of undoped and iron oxide doped CNTs.
Figure 9B:
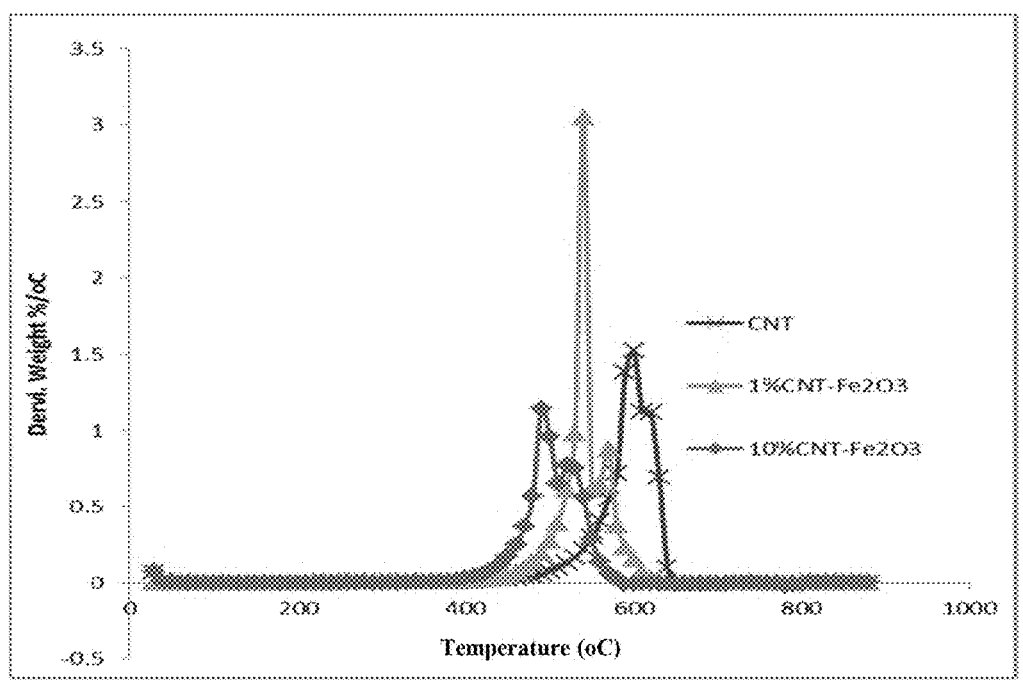

FIG. 9 depicts the TGA-DTG results for the carbon nanotubes with and without iron nanoparticles (CNTs-$Fe_2O_3$). The initial degradation of CNTs which has been carried out in air condition starts at approximately 550° C. and reaches a maximum weight loss of at about 600° C. and completes at about 670° C. as revealed by the DTG curve. While for CNTs impregnated with 1 wt. % iron nanoparticles the initial oxidation temperatures starts at 500° C. reaches a maximum weight loss of at about 550° C. and completes at about 600° C. as revealed by the DTG curve as shown in FIG. 9B. Increasing the loading of $Fe_2O_3$ to 10 wt. % shifts the oxidation peak lower in which initial oxidation at this condition started at 450° C. with maximum weight losses at 500° C. and completes the oxidation at 540° C.

Figure 10A:
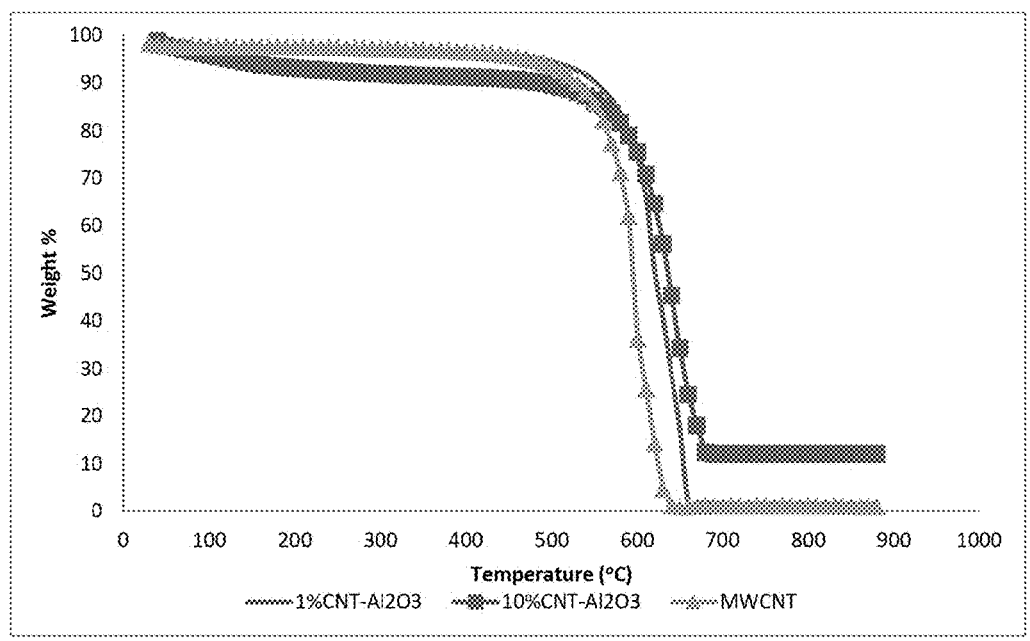
FIG. 10A is a graph of Thermogravimetric Analysis (TGA) and FIG. 10B is a graph of derivative thermogravimetric (DTG) for undoped and doped $Al_2O_3$-CNTs.
Figure 10B:
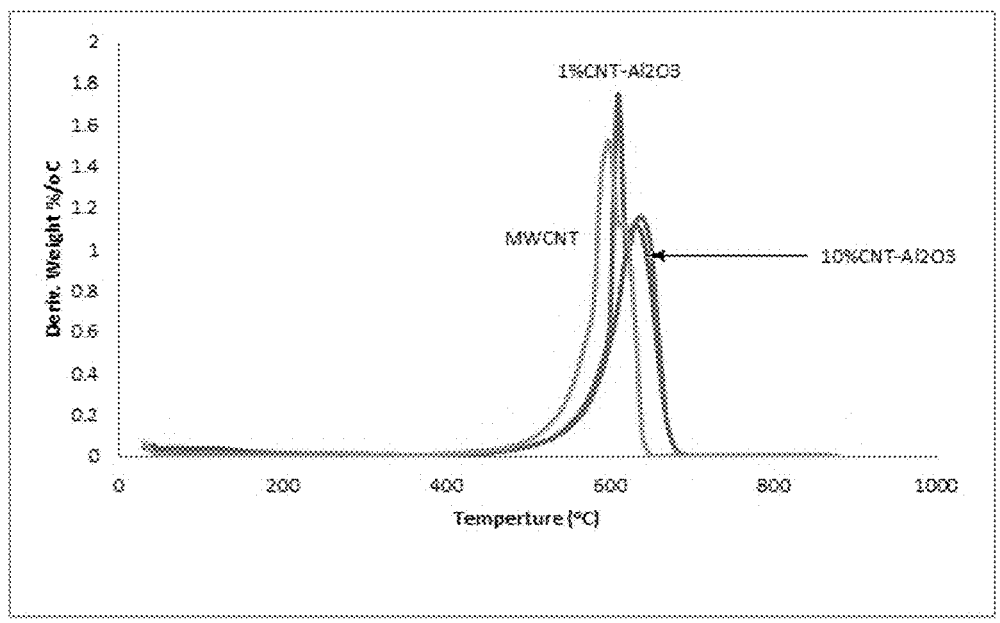

Similarly, FIG. 10A-B depict the TGA-DTG results for the carbon nanotubes with and without aluminum nanoparticles (CNTs-$Al_2O_3$). The initial degradation of CNTs which has been carried out in air condition starts at approximately 550° C. and reaches a maximum weight loss of at about 600° C. and completes at about 670° C. as revealed by the DTG curve. While for CNTs impregnated with 1 wt. % aluminum nanoparticles the initial oxidation temperatures starts at 500° C. reaches a maximum weight loss of at about 550° C. and completes at about 600° C. as revealed by the DTG curve as shown in FIG. 10B. Increasing the loading of $Al_2O_3$ to 10 wt. % shifts the oxidation peak lower in which initial oxidation at this condition started at 450° C. with maximum weight losses at 500° C. and completes the oxidation at 540° C.

Figure 11A:
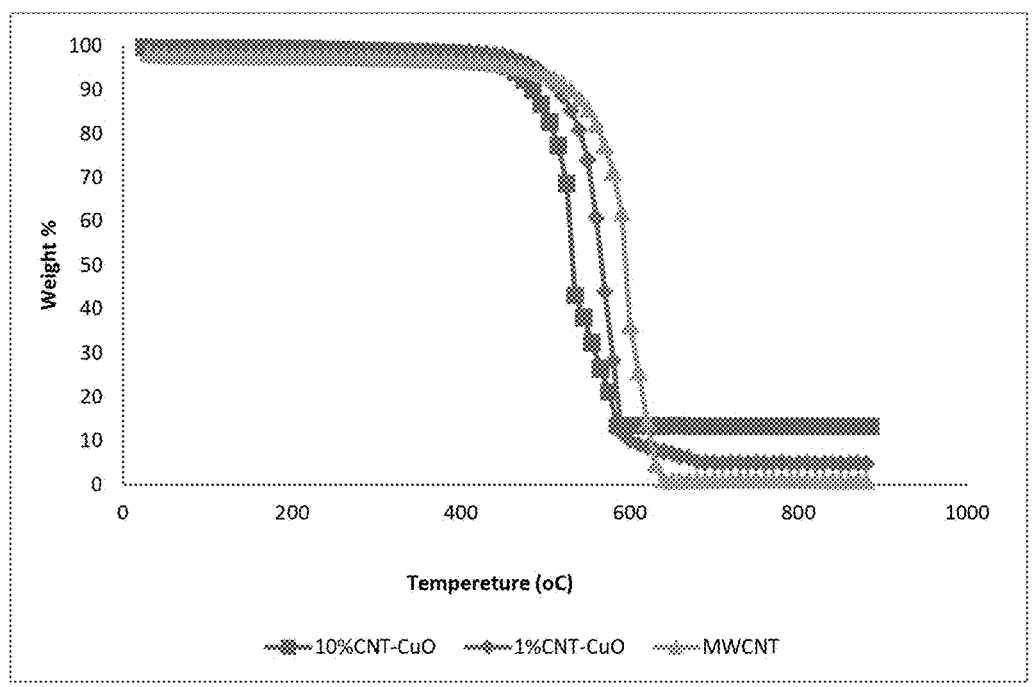
FIG. 11A is a graph of Thermogravimetric Analysis (TGA) and FIG. 11B is a graph of derivative thermogravimetric (DTG) for undoped and doped CuO-CNTs.
Figure 11B:
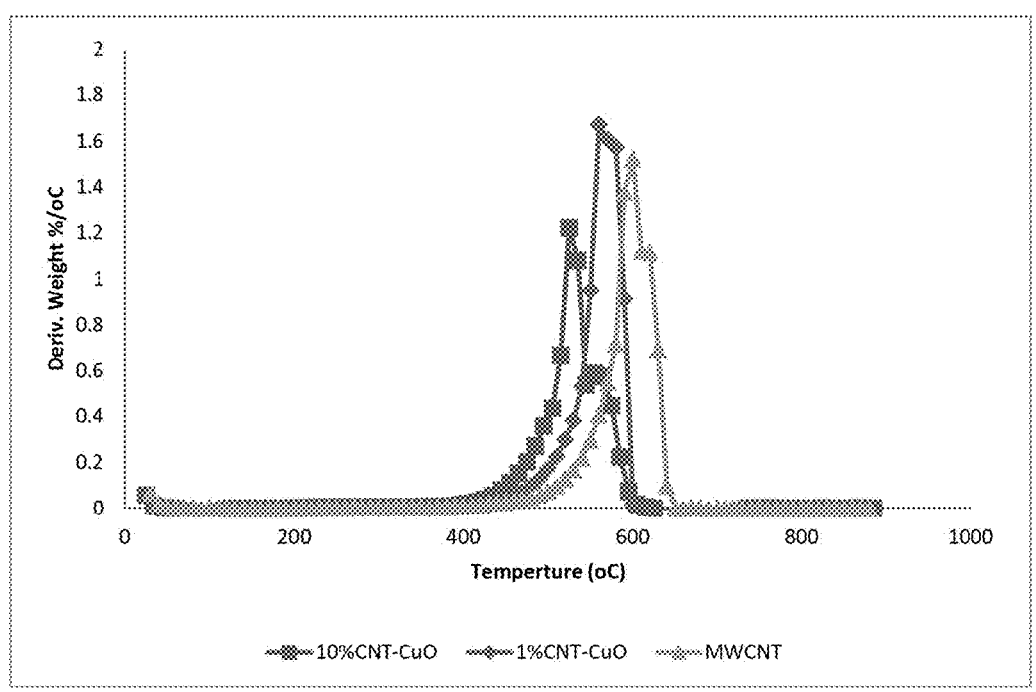

Further, FIG. 11A-B depict the TGA-DTG results for the carbon nanotubes with and without copper nanoparticles (CNTs-CuO). The initial degradation of CNTs which has been carried out in air condition starts at approximately 550° C. and reaches a maximum weight loss of at about 600° C. and completes at about 670° C. as revealed by the DTG curve. While for CNTs impregnated with 1 wt. % copper nanoparticles the initial oxidation temperatures starts at 500° C. reaches a maximum weight loss of at about 550° C. and completes at about 600° C. as revealed by the DTG curve as shown in FIG. 11B. Increasing the loading of CuO to 10 wt. % shifts the oxidation peak lower in which initial oxidation at this condition started at 450° C. with maximum weight losses at 500° C. and completes the oxidation at 540° C.

It is well know that metal oxide particles have high thermal conductivity. For this reason the CNTs doped with metal oxide nanoparticles burn faster than normal CNTs, due to the high transfer of the heat from the surface of the particles to the surface of CNTs. For instance, at higher loading of iron particles, the doped CNTs burn faster than normal CNTs by 20%.

Example 10

Viscosity of Nanofluids

Figure 12A:
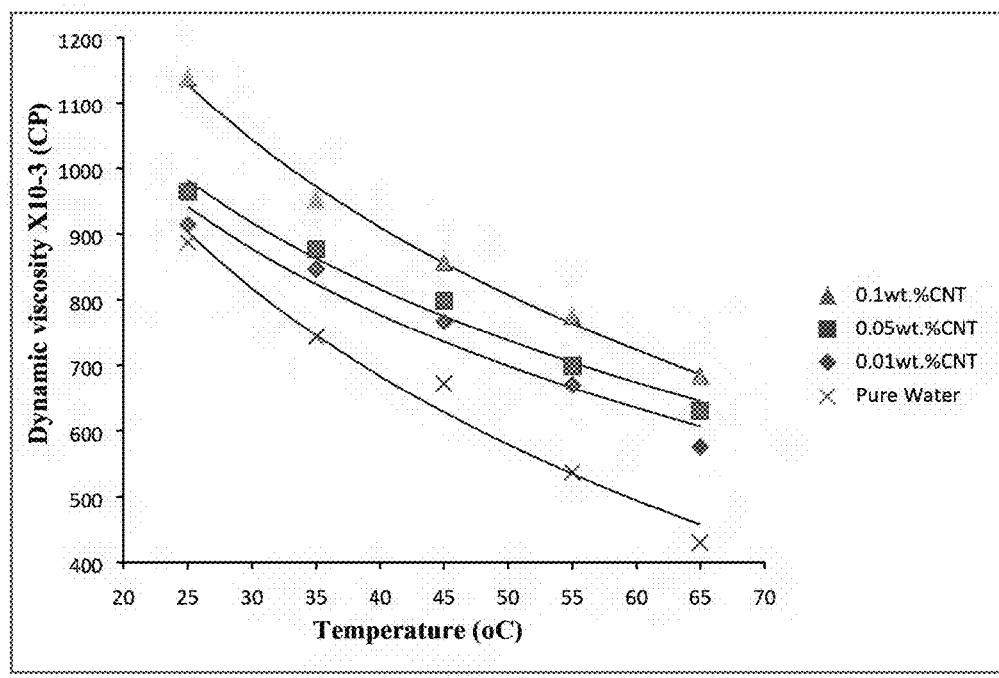
FIG. 12A is a graph illustrating the variation of viscosity with respect to temperature of undoped CNTs.
Figure 12B:
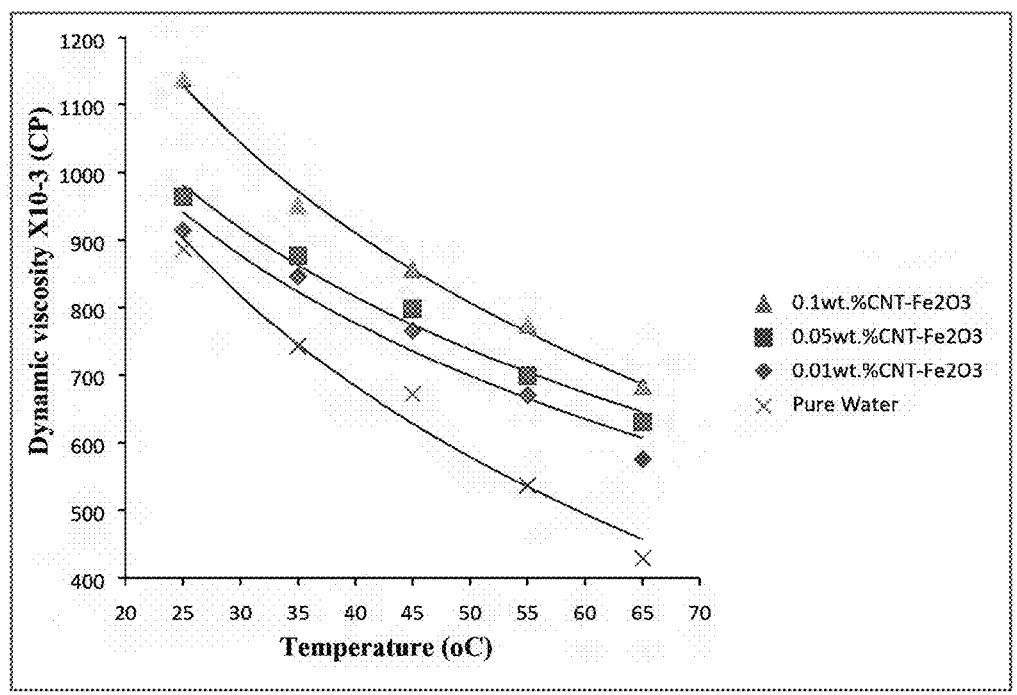
FIG. 12B is a graph illustrating the variation of viscosity with respect to temperature of 1 wt. % $Fe_2O_3$-CNTs
Figure 12C:
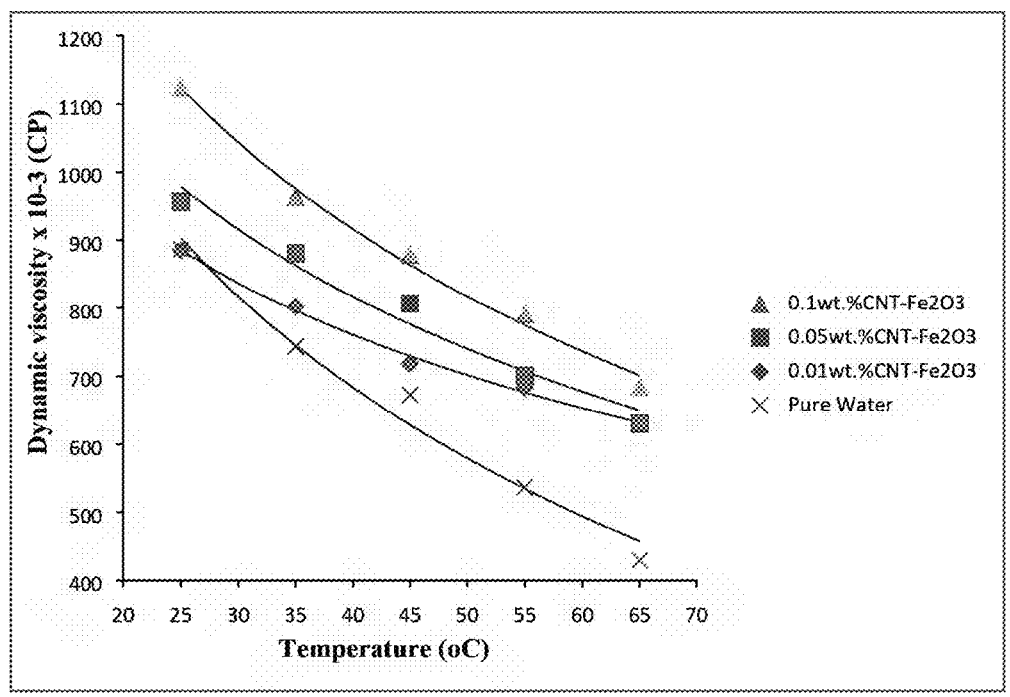
FIG. 12C is a graph illustrating the variation of viscosity with respect to temperature of 10 wt. % $Fe_2O_3$-CNTs.
Figure 13A:
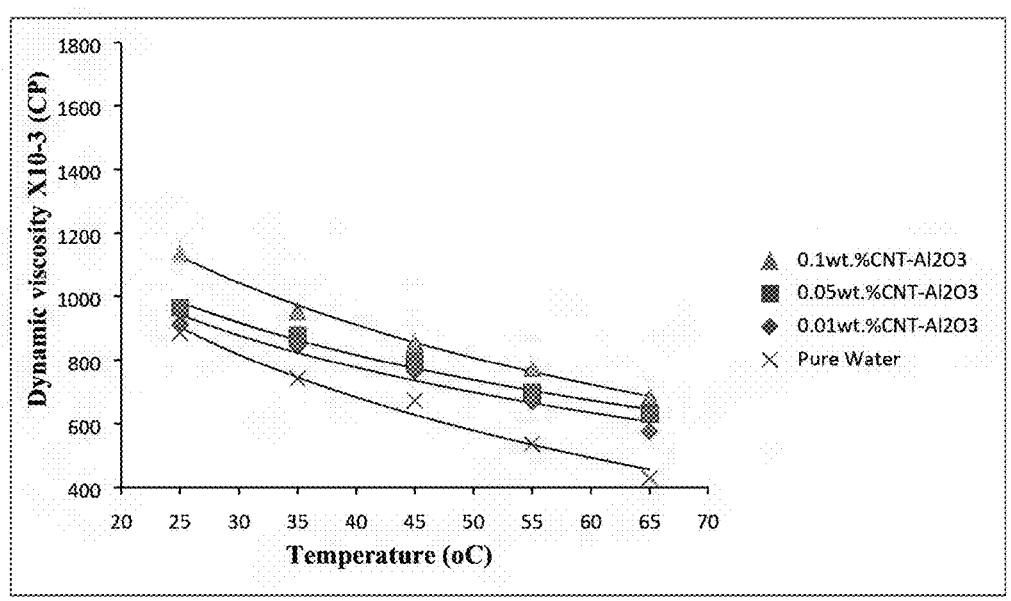
FIG. 13A is a graph of viscosity with respect to temperature for 1 wt. % $Al_2O_3$-CNTs
Figure 13B:
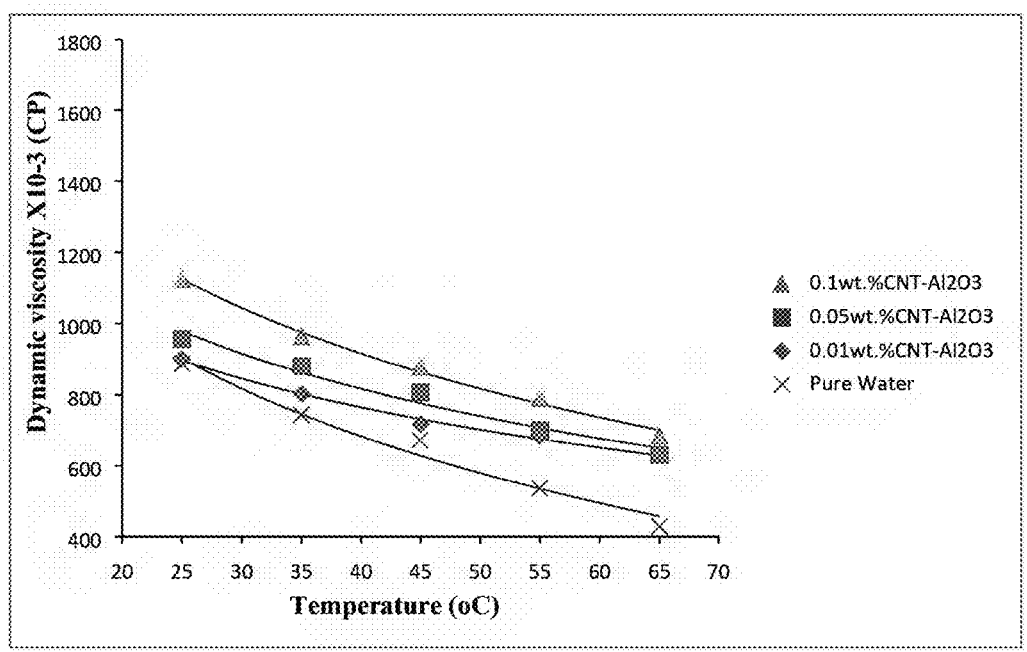
FIG. 13B is a graph of viscosity with respect to temperature for 10 wt. % $Al_2O_3$-CNTs.
Figure 14A:
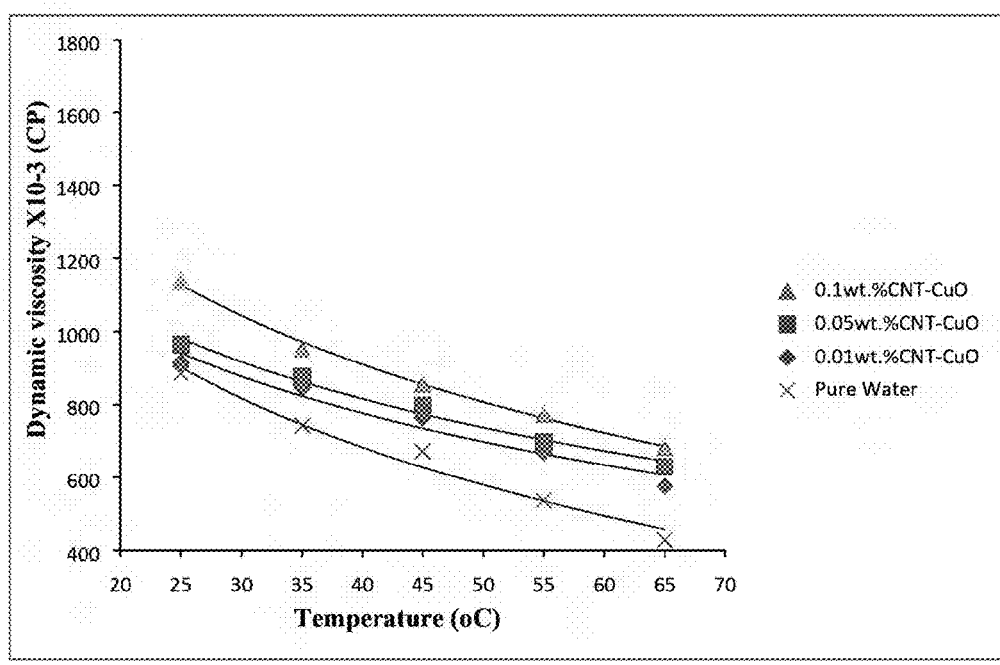
FIG. 14A is a graph of viscosity with respect to temperature for 1 wt. % CuO-CNTs
Figure 14B:
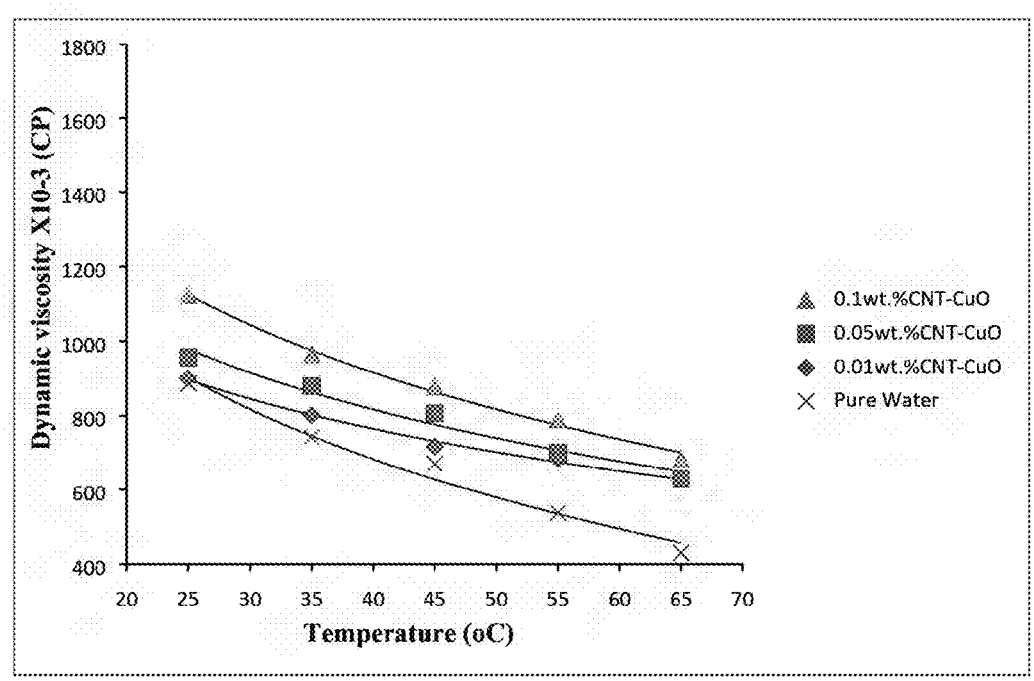
FIG. 14B is a graph of viscosity with respect to temperature for 10 wt. % CuO-CNTs.

FIG. 12 A-C shows the viscosity of nanofluids as a function of temperature at different loading of doped and undoped CNTs. The results indicate that the viscosity of nanofluids significantly increases with increasing in the concentration of the nanoparticles. However, the results indicate that viscosity of nanofluids diminishes exponentially as the sample fluid temperature increases. The microscopic view of the molecular level of the fluids can be used to determine the reasons which lead to the decrease on the viscosity of the fluid with the increase in temperature. The viscosity of the fluid depends on two major factors. The first factor is strength of the atomic bonding between the molecules which depends on the structure, shape and the size of the molecules. The second factor is kinetic energy of the molecules which direct proportion to the temperature of the system. It can be concluded that increasing the temperature of the fluid will weaken the atomic bonding between the molecules and increase their kinetic energy which will lead to decrease the viscosity. The results show that the viscosity of the nanofluid at different loading of CNTs and doped CNTs at 0.01 wt. %, 0.05 and 0.1 wt. % increased the viscosity of the nanofluid up to 3%, 3.2% and 11% respectively. As shown in FIG. 12A, the behavior of each curve with different concentrations of undoped nanoparticles is comparable, indicating the consistency of trend of the experimental measurements. As shown in FIG. 12B-C there is no effect of the iron oxide nanoparticles doped on CNTs on the viscosity of the fluid, since the viscosity of the fluid is a function of the temperature of the fluid. Similar trends were observed in viscosity measurements in FIG. 13A-B for $Al_2O_3$ doped CNTs and FIG. 14A-B for CuO doped CNTs, as there is no effect of the aluminum or copper oxide nanoparticles doped on CNTs on the viscosity of the fluid, since the viscosity of the fluid is a function of temperature.

Figure 15:
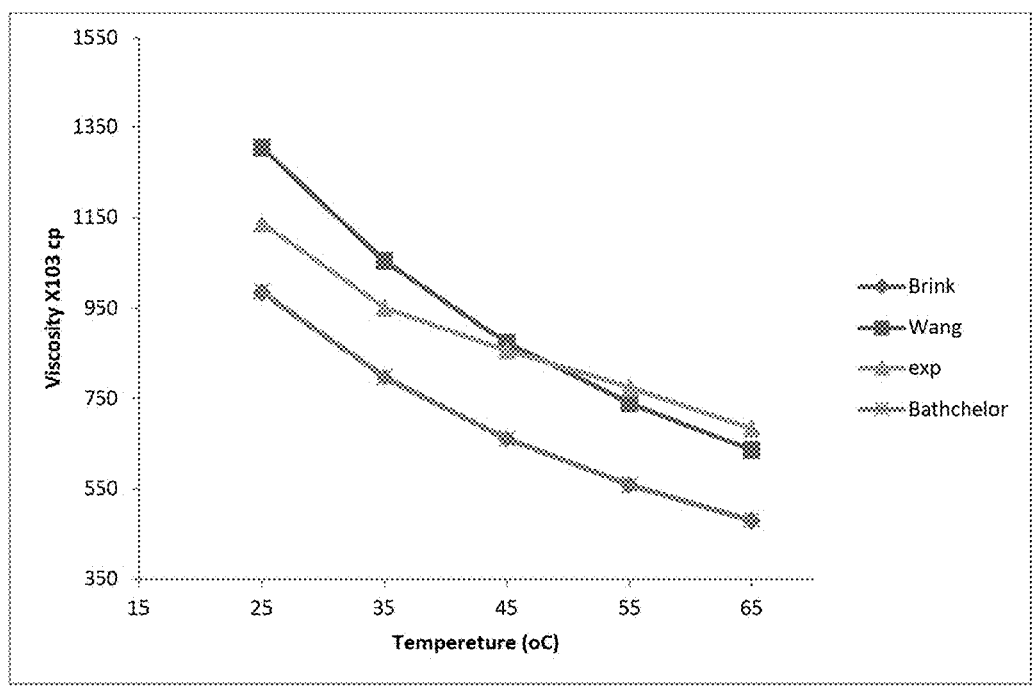
FIG. 15 is a graph comparing the viscosity between experimental values and calculated values from the Brink, Wang, and Batchelor correlations.

Moreover, FIG. 15 shows the comparison of experimental values of nanofluids viscosity with the predicted values from published models (Brinkman equation, Batchelor equation and Wang equation). The results show that the experimental values of nanofluids viscosity are consistent with the Wang equation, where the Wang equation is expressed as:

$$\mu_{nf} = (1 + 7.3\varphi + 123\varphi^2)\mu_w$$

where $\varphi$ is the volume concentration of nanoparticles, $\mu_{nf}$ is the viscosity of the nanofluid and $\mu_w$ is the viscosity of the base fluid.

Example 11

Thermal Conductivity

Figure 16:
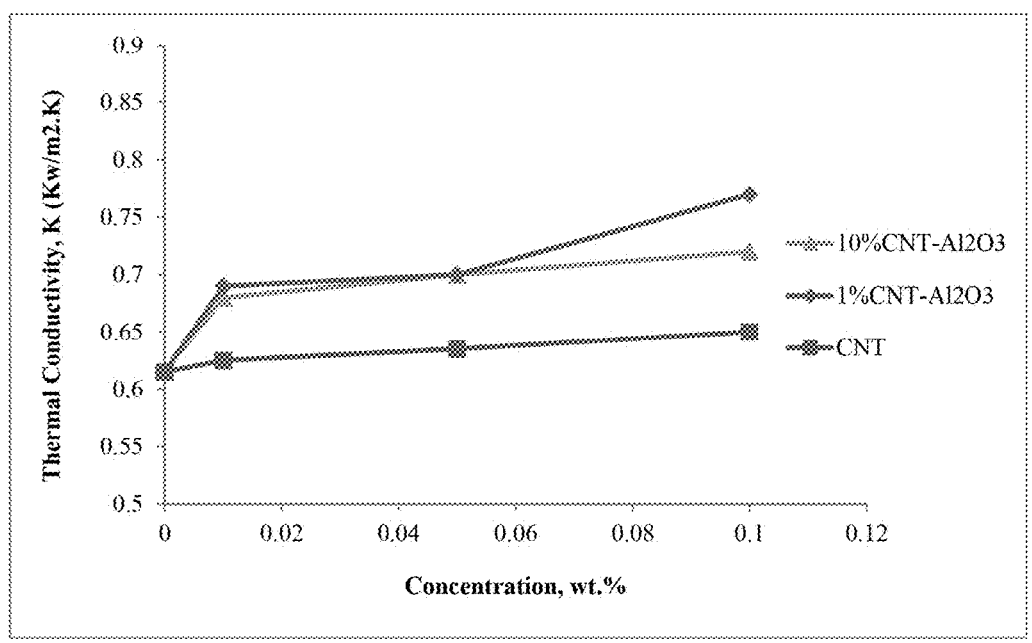
FIG. 16 is a graph of thermal conductivity of nanofluids containing unmodified and modified CNTs with $Al_2O_3$.

FIG. 16 shows the thermal conductivity enhancement for different types of nanofluids. The thermal conductivity of the present system has been measured at weight fractions of 0.01, 0.05 and 0.1 wt. % of raw and impregnated CNTs. From the experimental results, it is clear that CNT-water suspensions have noticeably higher thermal conductivities than the water base fluid, and the thermal conductivity increases with the increase in CNT weight concentration. A similar trend is also observed for the impregnated CNTs-$Al_2O_3$ suspensions. For unmodified CNT-water suspensions at a weight concentration of 0.01%, a thermal conductivity enhancement of up to 2.5% is observed compared to pure water while for higher concentrations of 0.05 wt. % and 0.1 wt. %, the thermal conductivity enhancements were 3.27% and 5.77%, respectively. However, for CNT doped with 1 wt. % of $Al_2O_3$, a significant enhancement of the thermal conductivity was observed. By adding 0.01 wt. % of CNT-$Al_2O_3$, the thermal conductivity of the nanofluid increased by 8%, while upon increasing the concentration of the nanomaterials to 0.05 wt. % and 0.1 wt. %, the enhancement was increased to 10% and 11%, respectively. By increasing the $Al_2O_3$ loading on the surface of CNTs to 10 wt. %, the thermal conductivity of the nanofluid increased to 10%, 11% and 16.4% at 0.01 wt. %, 0.05 wt. % and 0.1 wt. % weight concentration of CNT-$Al_2O_3$, respectively.

Example 12

Specific Heat Capacity of Nanofluids

The heat capacity of water as base fluid mixed with different concentration (0.01, 0.05 and 0.1 wt. %) of undoped and doped (1 and 10% of $Fe_2O_3$, $Al_2O_3$, and CuO nanoparticles) CNTs was investigated using DSC technique.

Figure 17A:
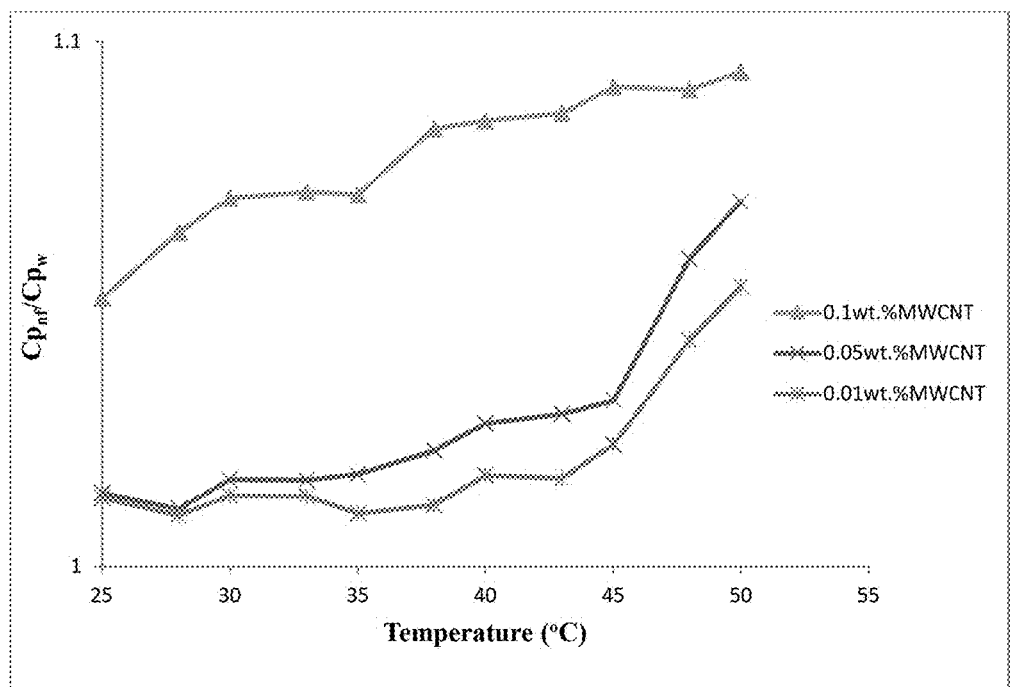
FIG. 17A is a graph illustrating the enhancement of the heat capacity of nanofluids with different concentrations of nanocomposites, as represented by the ratio the heat capacity of the nanofluid to heat capacity of water with undoped CNTs.
Figure 17B:
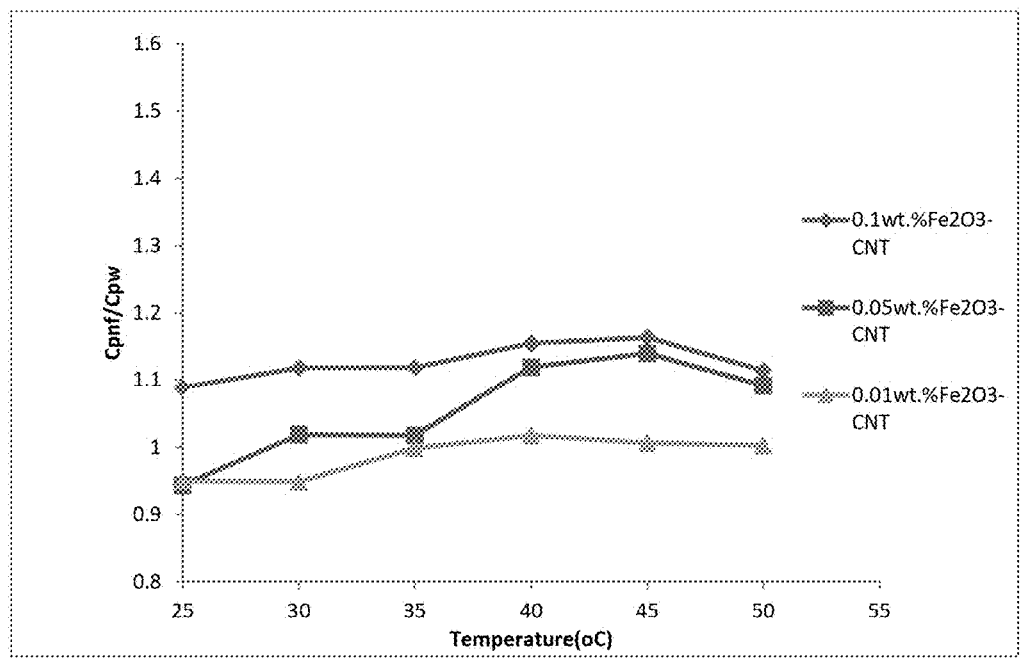
FIG. 17B is a graph of the same with 1 wt. % $Fe_2O_3$-CNTs.
Figure 17C:
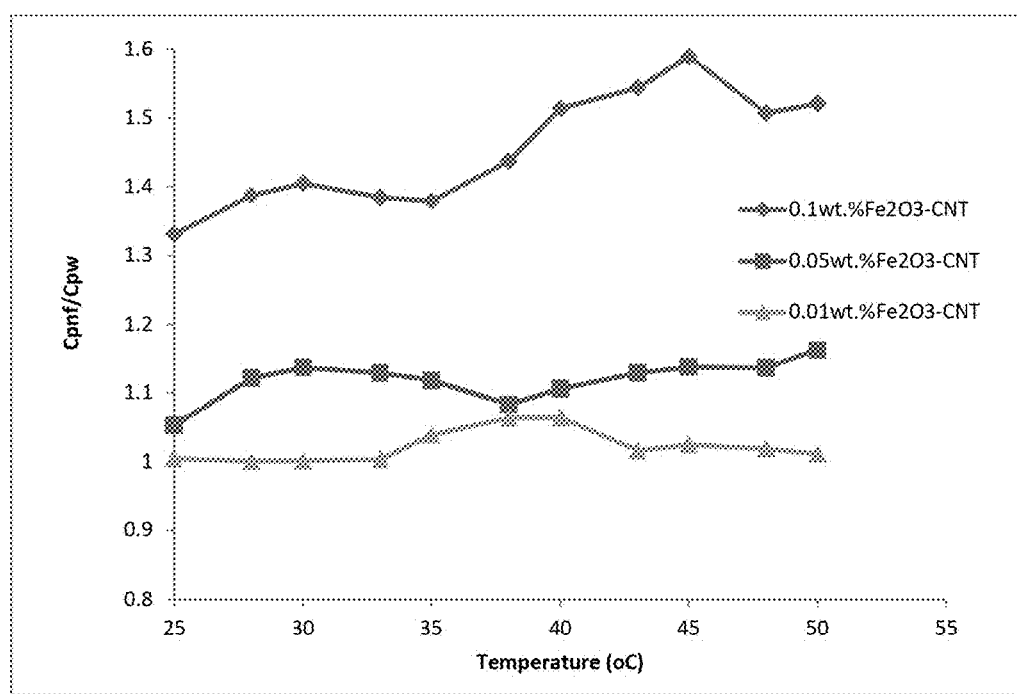
FIG. 17C is a graph of the same with 10 wt. % $Fe_2O_3$-CNTs with respect to temperature.
Figure 18A:
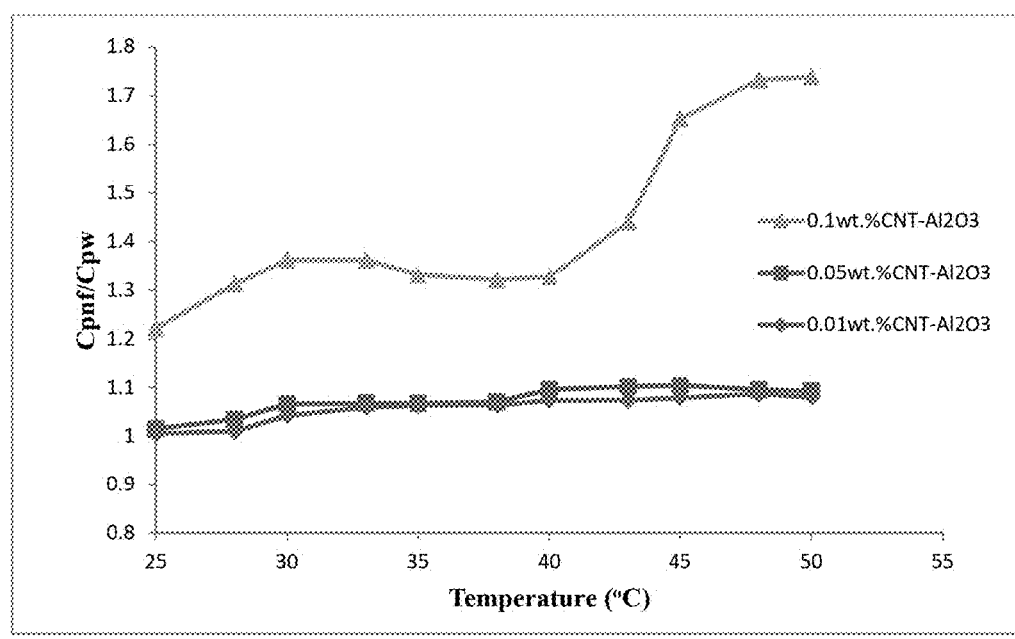
FIG. 18A is a graph of the heat capacity enhancement of 1 wt. % CNT-$Al_2O_3$
Figure 18B:
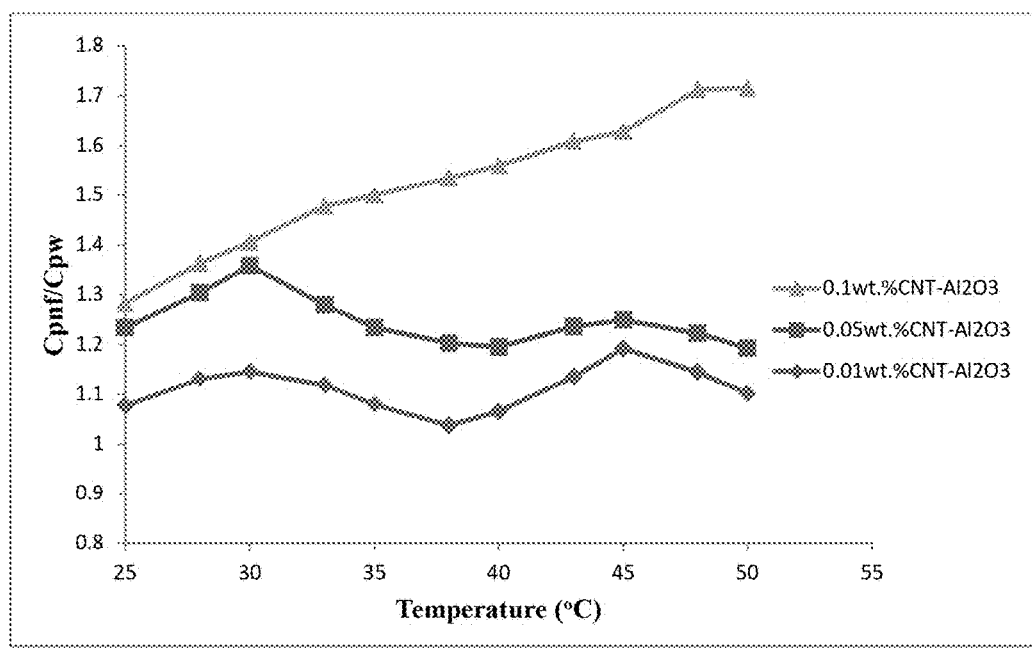
FIG. 18B is a graph of the heat capacity enhancement of 10 wt. % CNT-$Al_2O_3$ nanofluids with respect to temperature.
Figure 19A:
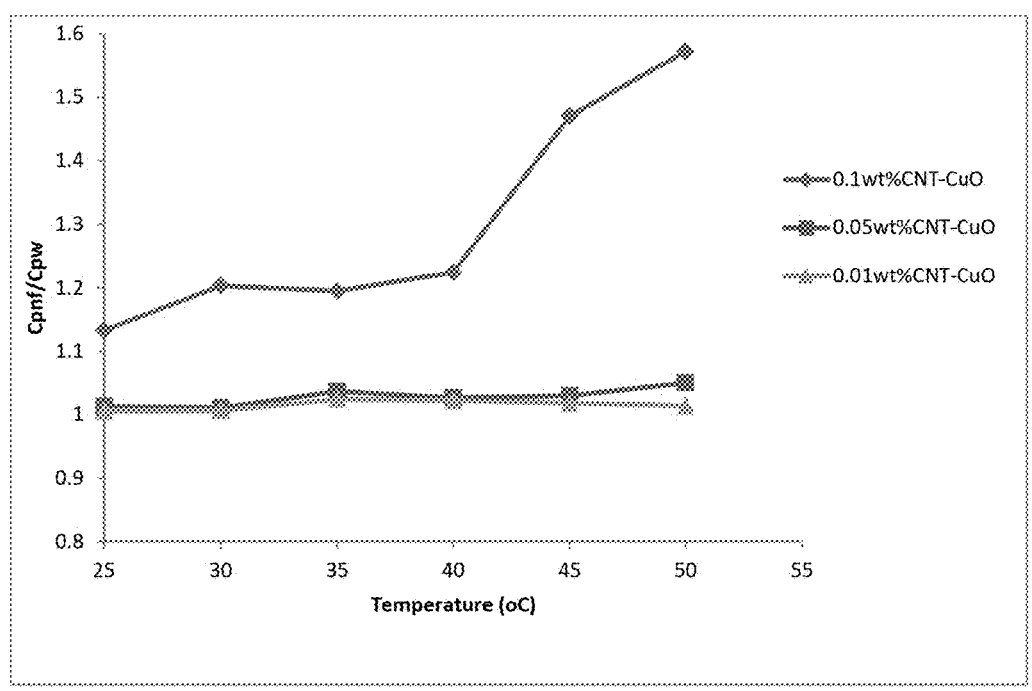
FIG. 19A is a graph of the heat capacity enhancement of 1 wt. % CuO-CNTs
Figure 19B:
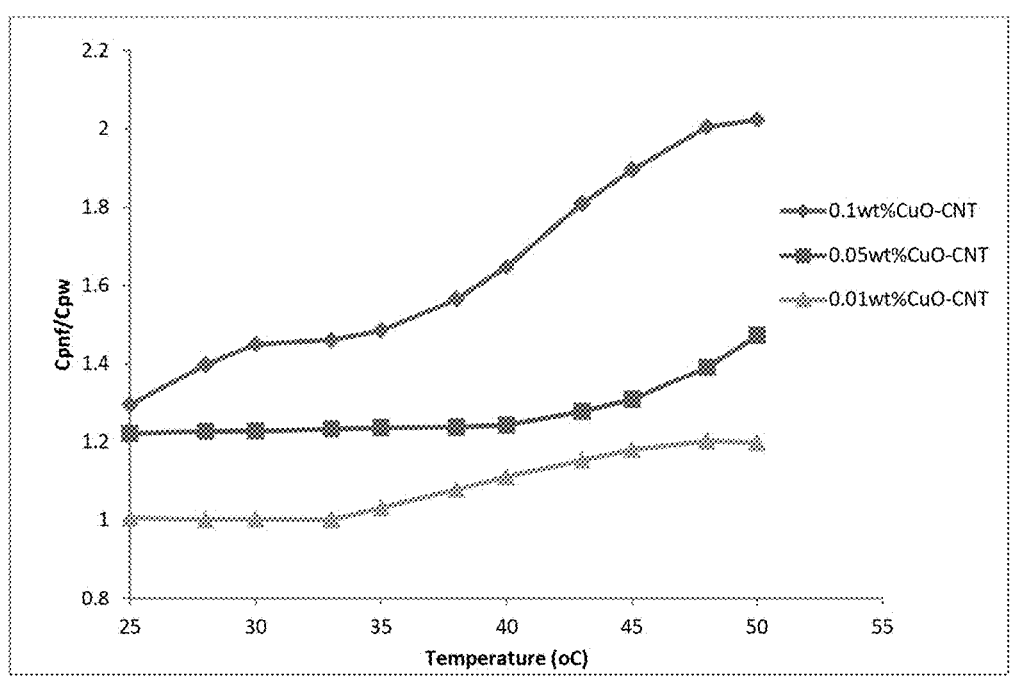
FIG. 19B is a graph of the heat capacity enhancement of 10 wt. % CuO-CNTs nanofluids with respect to temperature.

FIG. 17A shows the enhancement of the heat capacity of nanofluids ($Cp_{nf}/Cp_w$) as a function of temperature. Where $Cp_{nf}$ is the specific heat capacity of nanofluids and $Cp_w$ is the specific heat capacity of water. The results show that the heat capacity of nanofluids increases significantly with an increase in the concentration of undoped CNTs. FIG. 17B-C show that the heat capacity of nanofluids increases significantly with an increase in the concentration of doped CNTs with $Fe_2O_3$. The maximum enhancement of the specific heat for unmodified CNTs, and modified CNTs with (1 wt. % $Fe_2O_3$ and 10 wt. % $Fe_2O_3$) at weight concentration of 0.1 wt. % and 35° C. is 8%, 19% and 38% respectively. FIG. 18A-B show that the heat capacity of nanofluids increases significantly with an increase in the concentration of doped CNTs with $Al_2O_3$. The maximum enhancement of the specific heat for unmodified CNTs, and modified CNTs with (1 wt. % $Al_2O_3$ and 10 wt. % $Al_2O_3$) at weight concentration of 0.1 wt. % and 35° C. is 8%, 33% and 50% respectively. While FIG. 19A-B shows that the heat capacity of nanofluids increases significantly with an increase in the concentration of undoped and doped CNTs and also slightly increases with temperature. The maximum enhancement of the specific heat for unmodified CNTs, and modified CNTs with (1 wt. % CuO and 10 wt. % CuO) at weight concentration of 0.1 wt. % and 35° C. is 8%, 20% and 49% respectively. It can be noted that the unmodified CNTs enhanced the heat capacity of the water relatively, while impregnated or modified CNTs with metal oxide nanoparticles increased the heat capacity of water dramatically.

It has been reported by different research groups that the specific heat capacity of the CNTs is ranging from 0.6-0.7 (J/g·K) while the specific heat capacity of iron oxide particles is 0.451 (J/g·K). Based on these values the CNTs required 6 times less in energy to increase the temperature by 1° C. compare to water. For iron particles these values are even higher, and it requires 9 times less than water to increase the temperature of the fluid by 1° C. Mixing these highly thermal conductively nanoparticles with water enhances the thermal properties of the nanofluid as observed from the results. These results with agreement with TGA results which show the CNTs doped with iron nanoparticles burn faster than normal due to highly heat transfer of iron nanoparticles.

There are many mechanisms to explain the enhancement in thermal conductivity of nanofluids; it could be possible to expect the same mechanisms to explain the enhancement in heat transfer characteristics of nanofluids. They are based on aggregation of nanoparticles, Brownian motion and size and shape of nanoparticles.

For example, the average particles size of nanoparticles (doped CNT) is ~10 nm, as shown in SEM images, the ratio of surface area to volume (A/V) is 1500 times greater for nanoparticles in 15 nm diameter than in 15 μm diameter. The larger surface area can thus increase heat transfer capabilities. The Fluids contain suspended solid particles in a nano scale have better heat capacities than the fluids contain coarse solid particles on a micro scale. Due to the high surface area to volume ratio of nanoparticles and high viscosity of the nanofluids, the percolating network formed by the adsorbed nanolayer enhances the heat capacity of nanofluid. These adsorption layers act as continuous percolation paths for easy transport of thermal energy through the medium. Furthermore, the effect of temperature on thermal conductivity has been confirmed, and also found the enhancement of thermal conductivity in nanofluids based on water using alumina nanoparticles is inversely proportional with particle-size. All these results show that the nanoparticle motion in nanofluids has an important role in the heat capacity enhancement. Nanoparticles in motion may act as "agitators" to encourage convection to enhance the effective heat capacity in nanofluids. So the Brownian motion of particles is the key mechanism of the thermal conductivity enhancement in nanofluids.

In addition, the shape of nanoparticles may be another factor that effects the heat capacity. The undoped and doped CNT both have a cylindrical shape which might provide greater heat capacity enhancement than that nanofluids with spherical particles. This is due to the rapid heat transfer along relatively distance in cylindrical particles, where the length of cylindrical particles usually have micrometer lengths.

Example 13

Heat Transfer of Nanofluids

Duple pipe heat exchanger was used to conduct the experiment of heat transfer of the nanofluid. Several types of nanomaterials were used in this experiment to investigate their effect on the heat transfer of the nanofluid, including unmodified CNTs, 1 wt. % $Fe_2O_3$-CNTs, 10 wt. % $Fe_2O_3$-CNTs, 1 wt. % $Al_2O_3$-CNTs, 10 wt. % $Al_2O_3$-CNTs, 1 wt. % CuO-CNTs, and 10 wt. % CuO-CNTs. The nanofluids were prepared at three weight concentrations of nanomaterial (0.01, 0.05 and 0.1 wt. %). The inlet temperature of the nanofluids was fixed by controlling the heating bath at 35° C. while their flow rate was controlled by a digital mass flow controller to be in a turbulent regime ranging from 200-640 kg/h.

Figure 20:
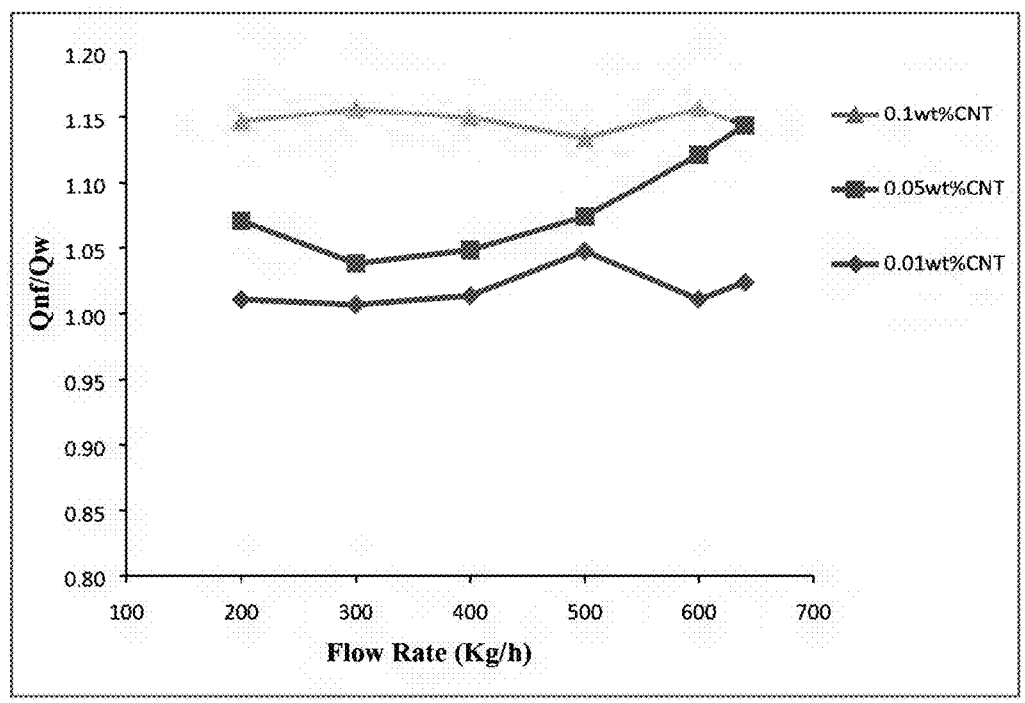
FIG. 20 is a graph illustrating the enhancement of heat transfer of nanofluids with different concentrations of undoped CNTs at varying flow rates.

FIG. 20 shows the effect of different weight concentration of CNTs (0.01, 0.05 and 0.1 wt. %) on the enhancement of heat transfer of the nanofluids at different flow rates (kg/h). It was observed that, the heat transfer ratio ($Q_{nanofluid}/Q_{water}$) increases with an increase in the weight concentrations of unmodified CNTs. The maximum enhancement of heat transfer was 15% at 0.1 wt. % and 400 kg/h mass flow rate. This result is consistent with the Cp results of the CNTs-Water nanofluid which shows enhancement of the heat capacity of water by about 8% after adding the CNTs. The other 7% enhancement in the heat transfer of nanofluid could be from the enhancement of the dispersion of the CNTs into the solution due to high motion of the fluid which reduces the agglomeration and increase the dispersion. The agglomeration of the nanoparticles is one of the major problems that make the fluid unstable. In order to have a stable fluid, the particles have to be dispersed in the solution either mechanically or chemically. Mechanically by applying a sonication waves to break down the van der walls interaction forces between the particles. Chemically is by modified the surfaces of the particles by adding surfactant that is soluble in the fluid. In this study only the mechanical approach was used in order to prevent the effect of the chemical surfactant on the properties of the nanofluids which might affect the viscosity, the heat capacity and the chemical structure of the fluid.

The other possible reasons for the enhancement in heat transfer of fluid by suspending the CNT could be (a) the nanoparticles led to increased surface area, thermal conductivity and heat capacity of the fluids (b) the collision and interaction between the nanoparticles and water strengthens the mixing fluctuation and turbulence of the fluid.

Figure 21A:
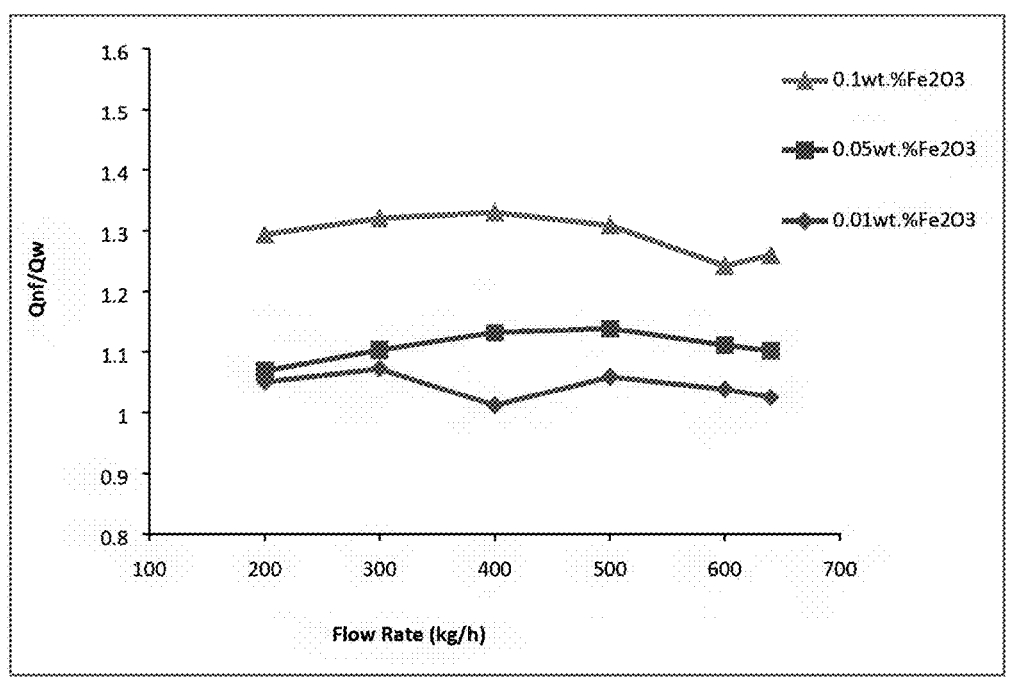
FIG. 21A is a graph illustrating the enhanced heat transfer of nanofluids with different concentrations containing 1% $Fe_2O_3$-CNT and FIG. 21B is a graph illustrating the enhanced heat transfer of nanofluids with different concentrations containing 10% $Fe_2O_3$-CNT nanocomposites as a function of flow rate.
Figure 21B:
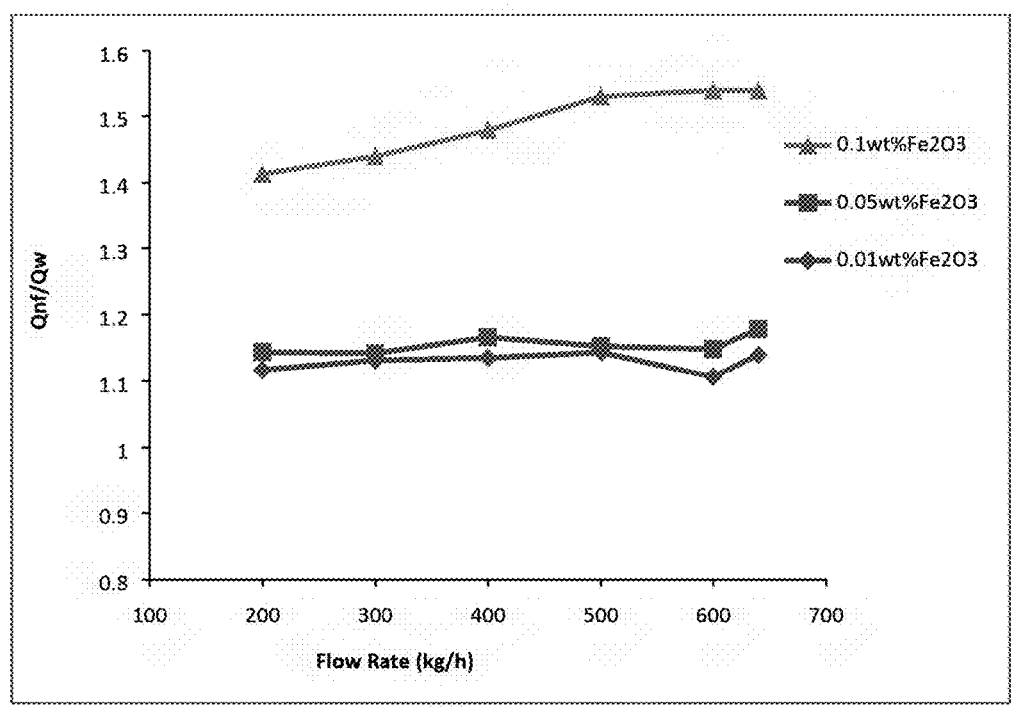

The same phenomena were observed when doped CNTs with iron nanoparticles were used. The heat transfer of the nanofluid increased with the increase in the concentration of doped CNTs as shown in FIG. 21. Due to the large enhancement on the heat capacity of the CNTs/iron oxide composite, the heat transfer of the nanofluid contain CNTs/Iron oxide composite at 0.1 wt. % increased by almost 30% compare to water as base fluid and 15% higher than undoped CNTs with water at the same condition. Increasing the loading of the iron oxide nanoparticles on the surfaces of CNTs to 10 wt. % increased the heat transfer of the nanofluid up 60% at the concentration of 0.1 wt. %.

Figure 22A:
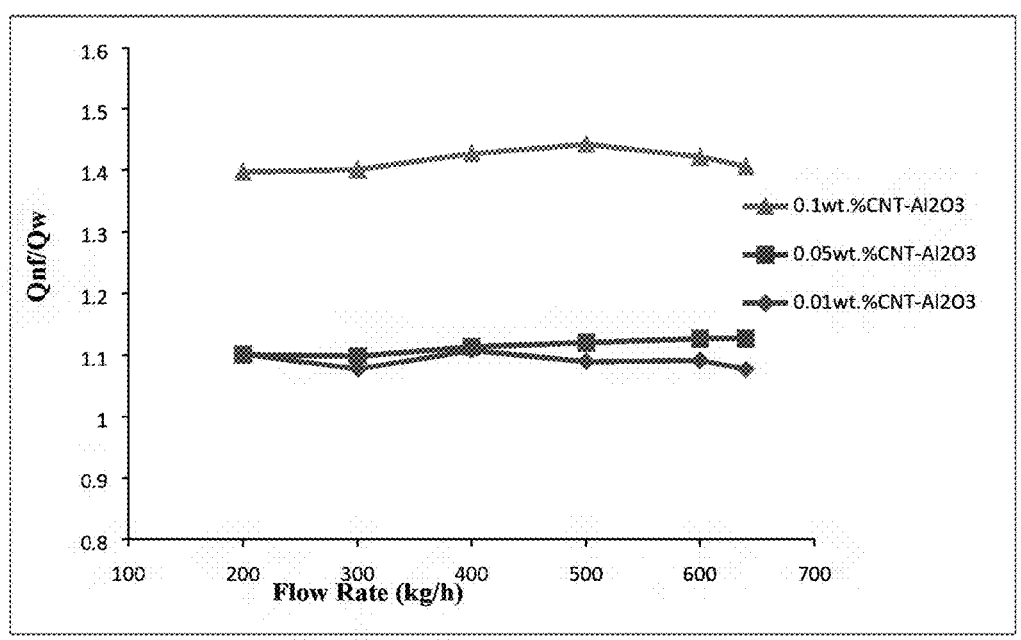
FIG. 22A is a graph of enhanced heat transfer of 1% CNT-$Al_2O_3$ and FIG. 22B is a graph of enhanced heat transfer of 10% CNT-$Al_2O_3$ nanofluids as a function of flow rate.
Figure 22B:
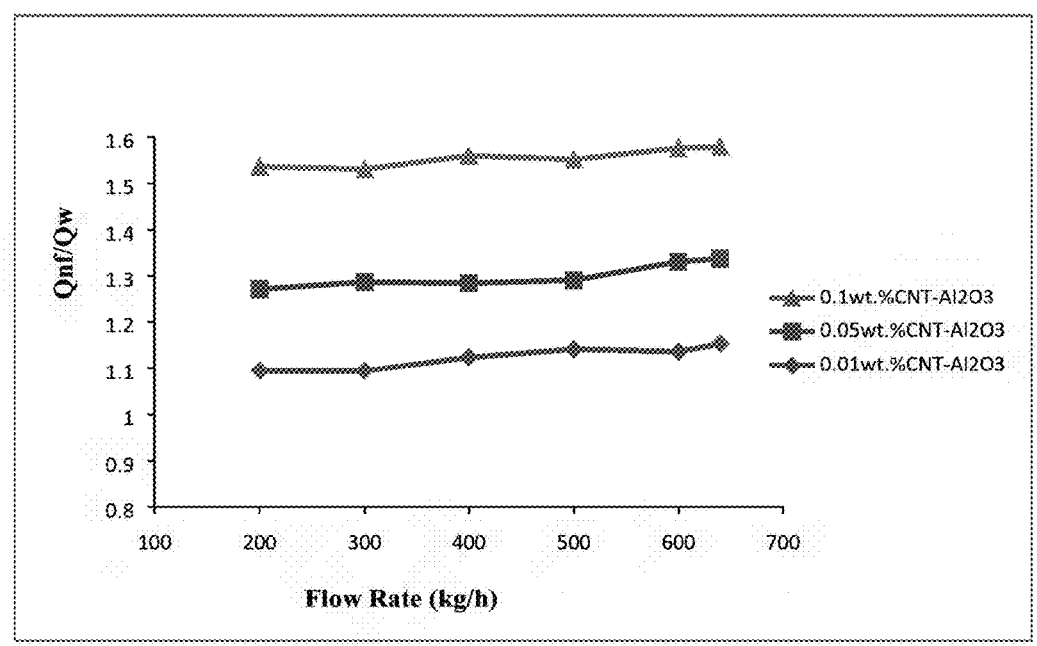

A similar trend was observed in FIG. 22A-B for $Al_2O_3$ nanoparticles. The heat transfer of the nanofluid containing 1 wt. % aluminum oxide/CNT composite at 0.1 wt. % increased by almost 44% compare to water as base fluid and 28% higher than undoped CNTs with water at the same condition. Increasing the loading of the aluminum oxide nanoparticles on the surfaces of CNTs to 10 wt. % increased the heat transfer of the nanofluid up 57% at the concentration of 0.1 wt. %. These results are consistent with the Cp results of the 1 wt. % and 10 wt. % aluminum oxide/CNTs-Water nanofluid which show enhancement of the heat capacity of water by 33% and 50% respectively after adding the doped CNTs.

Figure 23A:
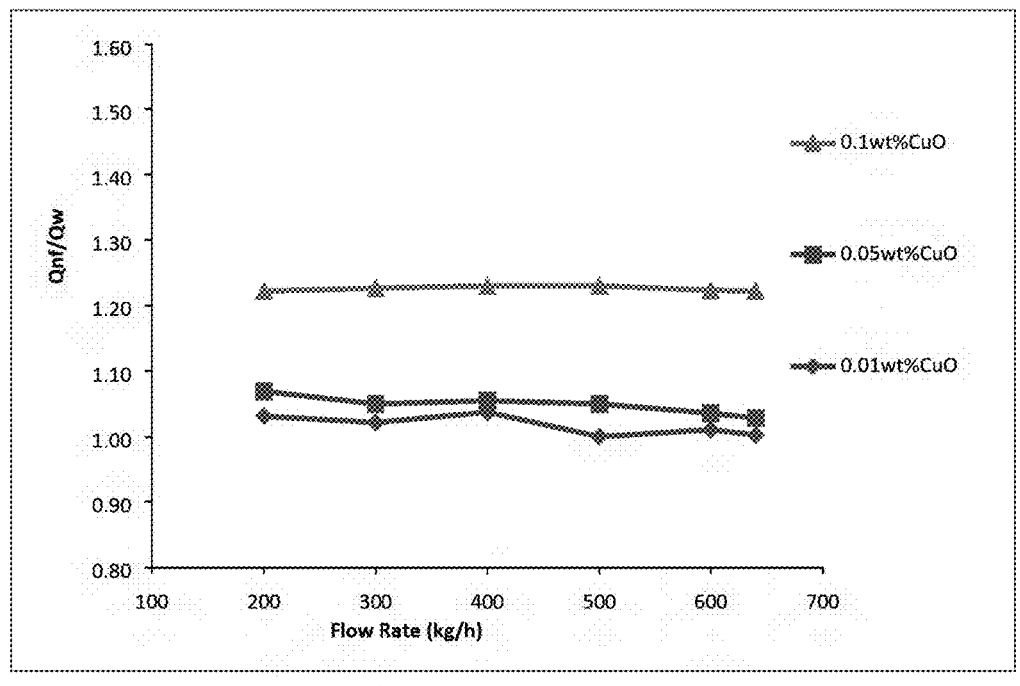
FIG. 23A is a graph of enhanced heat transfer of 1% CuO-CNT and FIG. 23B is a graph of enhanced heat transfer of 10% CuO-CNT nanofluids as a function of flow rate.
Figure 23B:
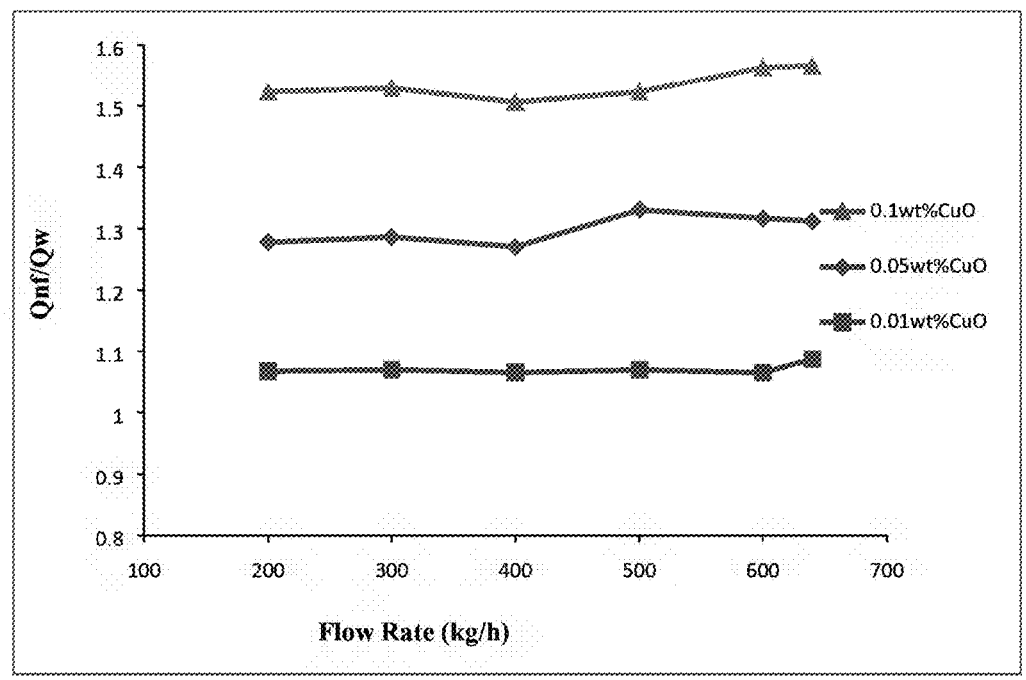

Further, the heat transfer of the nanofluid increases with the increase in the concentration of CuO-doped CNTs as shown in FIG. 23A-B. Due to the large enhancement on the heat capacity of the CNTs/copper oxide composite, the heat transfer of the nanofluid containing 1 wt. % copper oxide/CNT composite at 0.1 wt. % increased by almost 23% compare to water as base fluid and 8% higher than undoped CNTs with water at the same condition. Increasing the loading of the copper oxide nanoparticles on the surfaces of CNTs to 10 wt. % increased the heat transfer of the nanofluid up 58% at the concentration of 0.1 wt. %. These results are consistent with the Cp results of the 1 wt. % and 10 wt. % copper oxide/CNTs-Water nanofluid which show enhancement of the heat capacity of water by 20% and 49% respectively after adding the doped CNTs.

For all metal oxide doped CNTs, the observed enhancement of heat transfer is much higher than that of the increased heat capacity. This may be due to the enhancement of the dispersion of the doped CNT into solution, due to high motion of the fluid and reduced agglomeration, which enables flowing along the tube. Apart from the foregoing explanations it should be noted that the measurement of specific heat capacity is implemented under static conditions, whereas the measurement of heat transfer rate is conducted at dynamic flow conditions. Hence, interactions of the flow field with nanoparticles may be another reason for substantial rise of heat transfer rate.

Example 14

Mechanism of Enhancement the Heat Transfer

Figure 24:
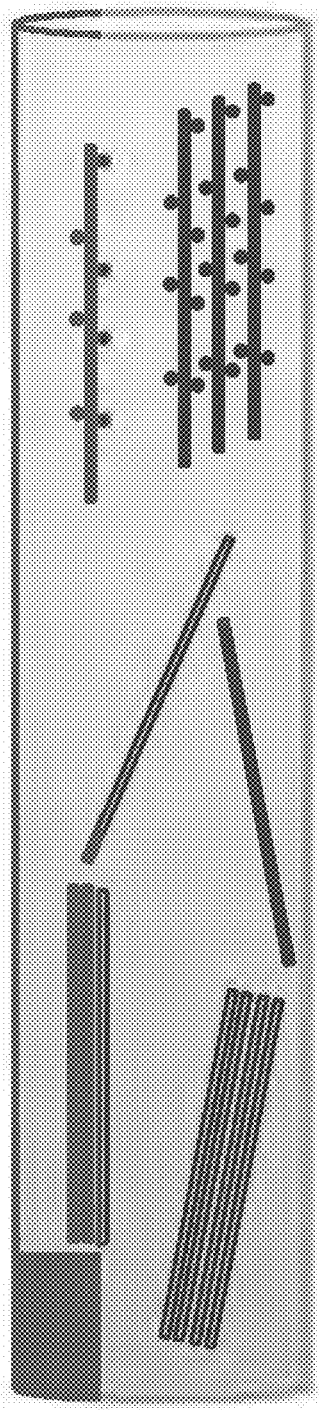
FIG. 24 is an illustration of a steel tube containing water as the base fluid ($C_{pFe2O3}$=4.185 J/g·° C.), undoped CNTs ($C_{pCNTs}$=0.6-0.7 J/g·° C.), and iron oxide nanoparticles ($C_p$=0.45 J/g·° C.) affixed the surface of the CNTs, such that the nanocomposite has a specific heat of $C_{p\ composite}$=$C_{pCNTs}$ $C_{pFe2O3}$.
Figure 25:
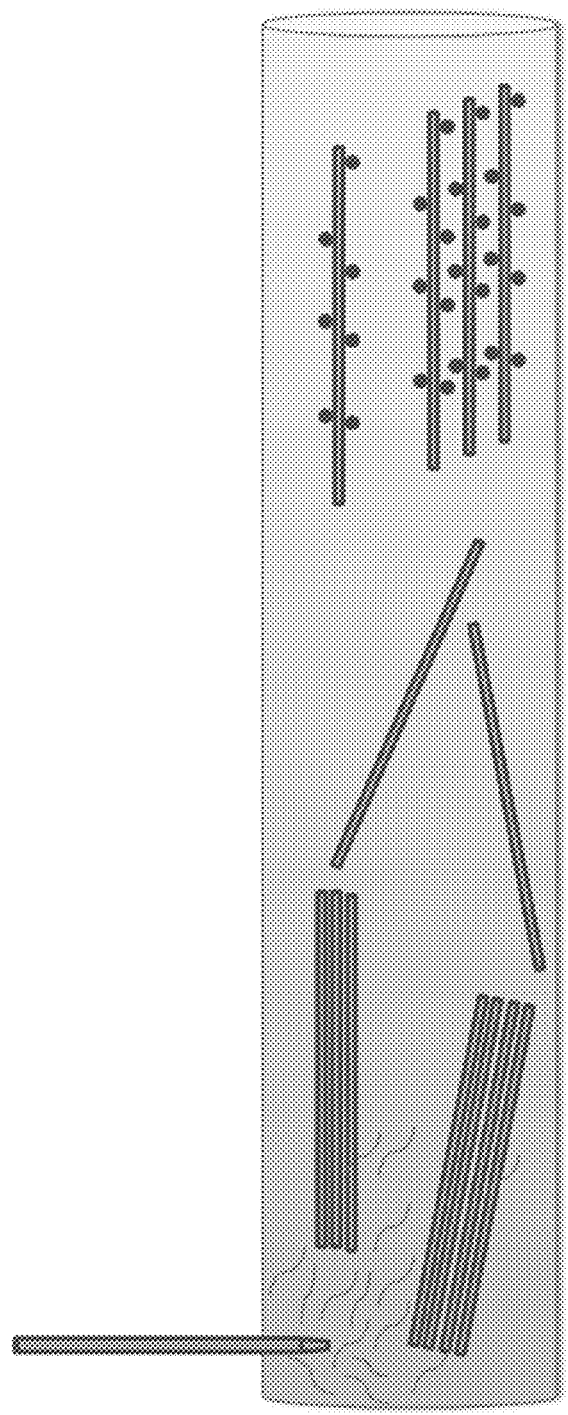
FIG. 25 is an illustration of a steel tube and a prop sonicator that generates sonication waves to break down the van der Walls interaction between carbon nanotubes in CNT bundles and that iron oxide nanoparticles affixed to the surface of CNTs reduces the agglomeration of the CNTs.
Figure 26:
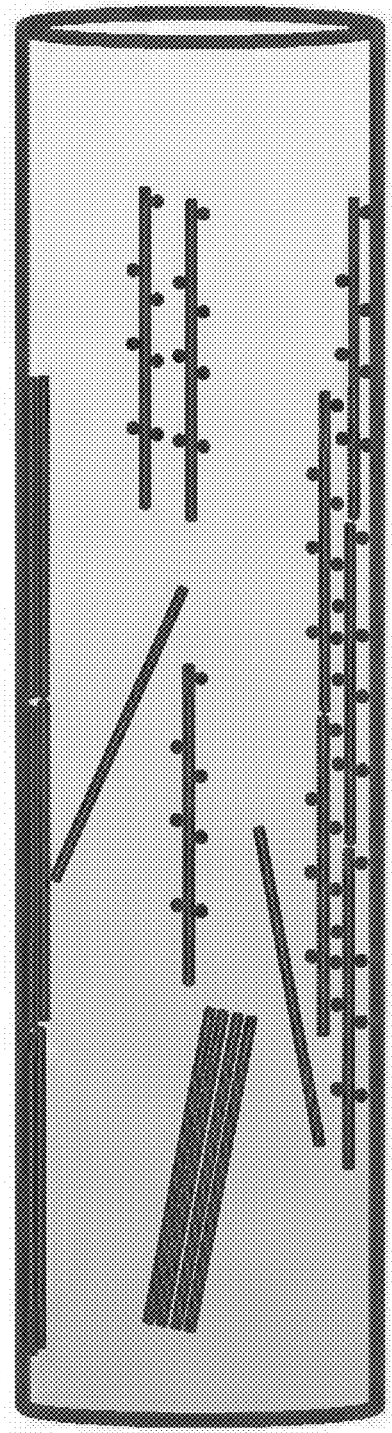
FIG. 26 is an illustration of a steel tube coated with undoped CNTs and CNTs impregnated with iron oxide nanoparticles.

There are many mechanisms that explain the enhancement in the heat transfer of the nanofluid. The first mechanism is the enhancement of the heat capacity of the nanofluid by adding a highly conductive nanomaterial such raw CNTs and modified CNTs with metal oxide nanoparticles (FIG. 24). It was noticed that the unmodified CNTs enhance relatively the heat capacity of the water, while impregnated or modified CNTs with metal oxide nanoparticles increased dramatically the heat capacity of water, as shown in FIG. 17 for $Fe_2O_3$ nanoparticles. It has been reported by different research groups that the specific heat capacity of the CNTs is ranging from 0.6-0.7 (J/g·K) while the specific heat capacity of iron oxide particles is 0.451 (J/g·K). Based on these values the CNTs required 6 times less in energy to increase the temperature of the nanofluid by 1° C. compare to pure water. Iron oxide requires 9 times less energy than pure water to increase the temperature of the fluid by 1° C. The second possible mechanism is due to coating of metal oxide nanoparticles on the surfaces of carbon nanotubes which enhances their separation and reduces the agglomeration. The agglomeration of the nanomaterials is one major contributor to reduced heat transfer of the nanofluid. Dispersion of highly conductive nanomaterials in the fluid will sharply increase the heat of fluid. As explained before the dispersion of nanomaterials is one of the major factors for obtaining a homogeneous solution. In order to obtain a homogeneous dispersion, two methods may be applied. The first method involves applying sonication waves to break down the van der walls interaction forces between the particles. The second method involves chemically modifying the surfaces of the particles by adding surfactant that is soluble in the fluid or adding elements to the surfaces of particles that reduces their aggregation. Both methods are adopted herein, by using a prop sonicator and chemically modifying the CNTs by impregnating the surfaces with metal oxide nanoparticles as depicted in FIG. 25. Another possible mechanism is the surface phenomena where the small layer of the unmodified and modified CNTs will coat the wall of the steel tube and enhance the thermal conductivity of the steel as depicted in FIG. 26. The last explanation for the enhancement of the heat transfers of the nanofluid is the influence of Brownian motion. While the Brownian movement of particles has its origins with the molecular collisions and its timescale is of the order of the molecular timescales, it is manifested through the particles that have inertia and respond at a much higher timescales. At these higher timescales, the movement of the particles agitates the fluid locally and this will increase the heat transfer.

Example 15

Pressure Drop of Nanofluids

Figure 27A:
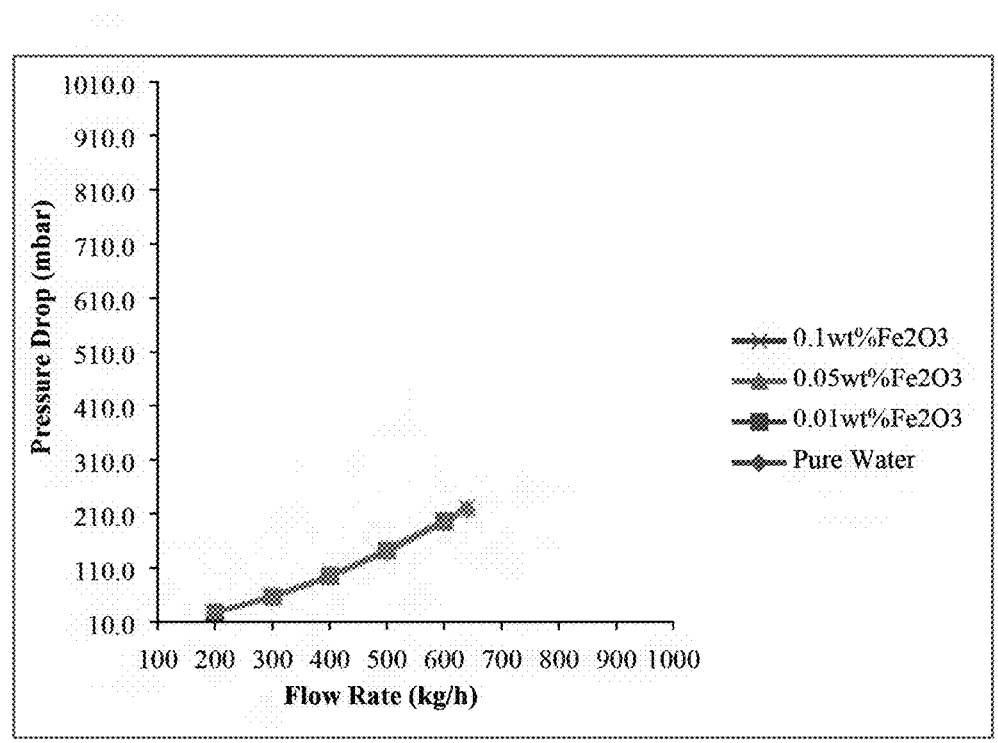
FIG. 27A is a graph illustrating the variation in the pressure drop with respect to the mass flow rate in a steel tube for 10% MWCNT-$Fe_2O_3$ nanofluids
Figure 27B:
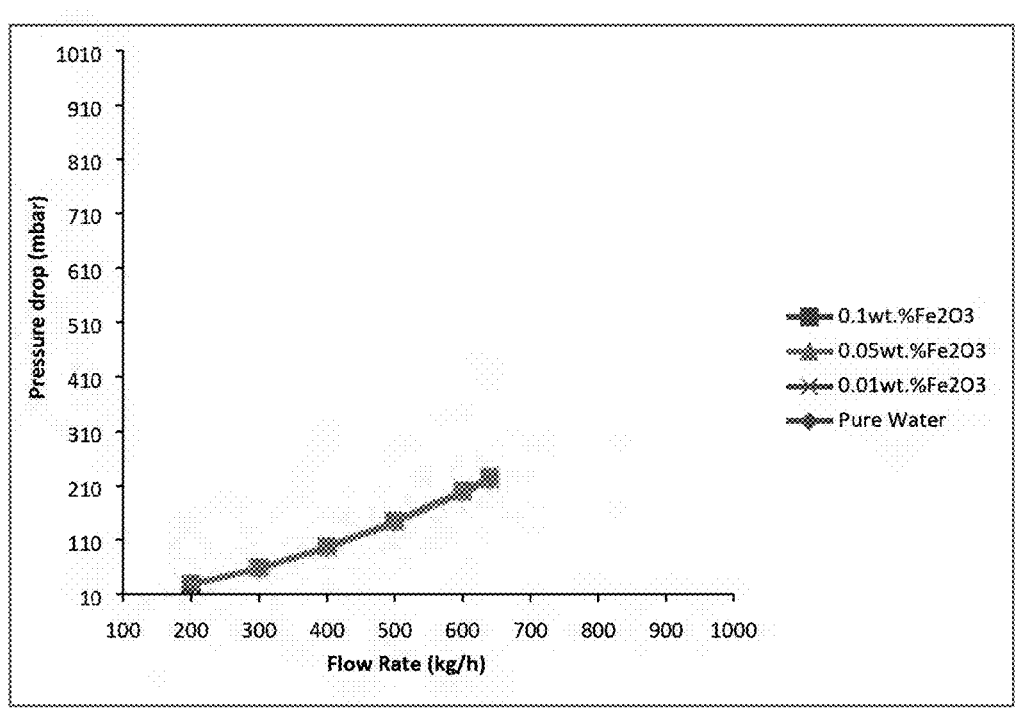
FIG. 27B is a graph illustrating the variation in the pressure drop with respect to the mass flow rate in a steel tube for 1% MWCNT-$Fe_2O_3$ nanofluids and FIG. 27C is a graph illustrating the variation in the pressure drop with respect to the mass flow rate in a steel tube for undoped MWCNT nanofluids.
Figure 27C:
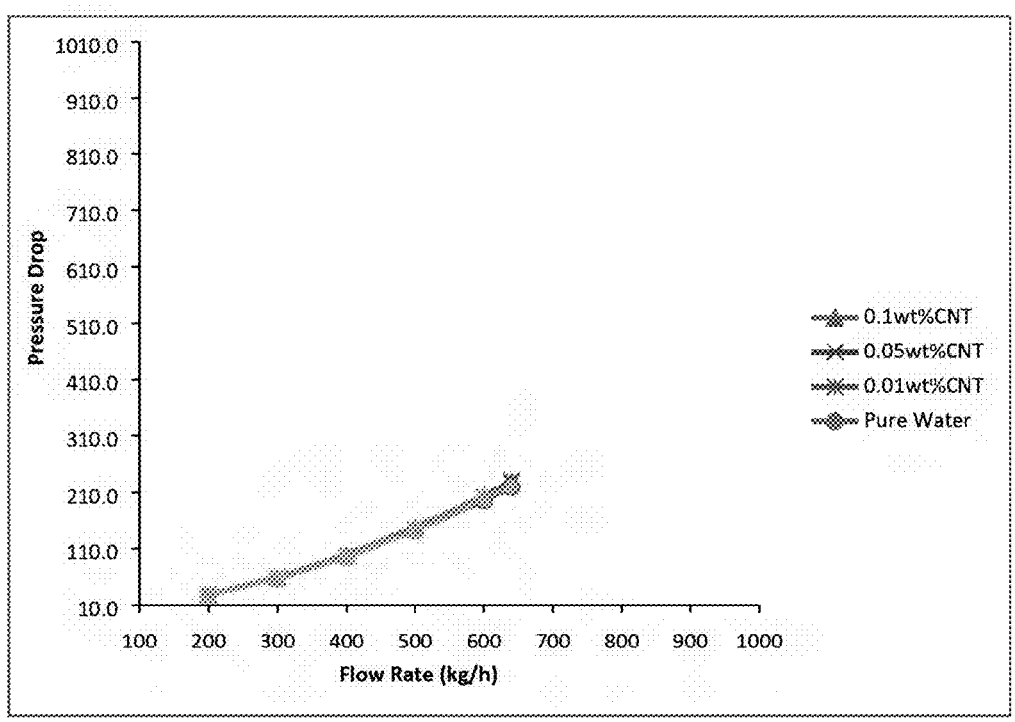
Figure 28A:
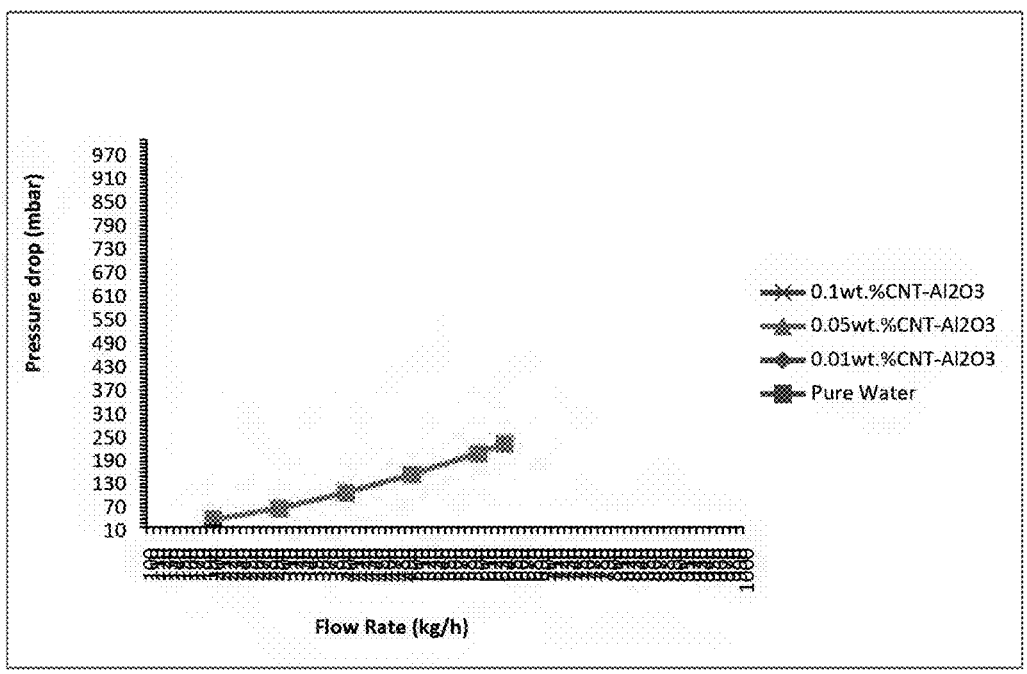
FIG. 28A is a graph of variation in the pressure drop with respect to the mass flow rate in steel tube for 10% MWCNT-$Al_2O_3$ nanofluids and FIG. 28B is a graph of variation in the pressure drop with respect to the mass flow rate in steel tube for 1% MWCNT-$Al_2O_3$.
Figure 28B:
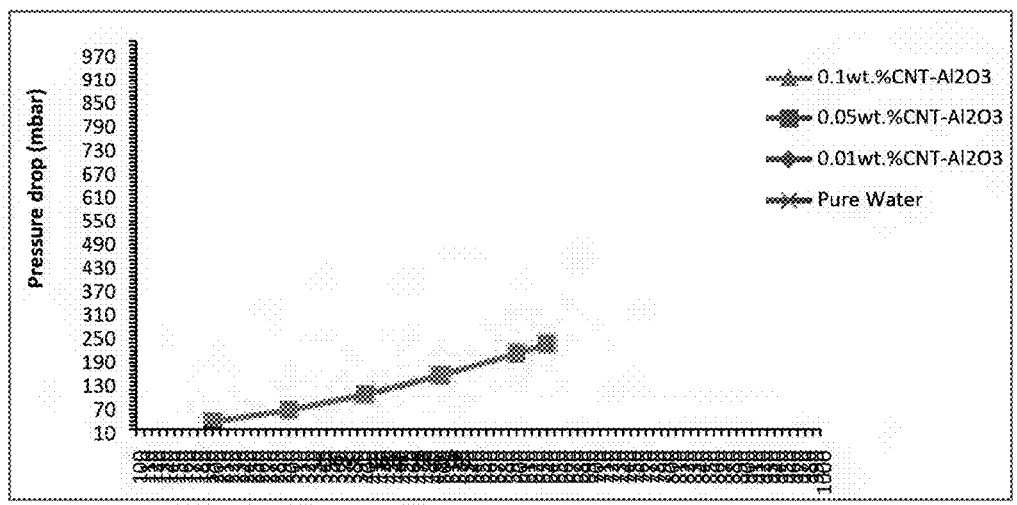
Figure 29A:
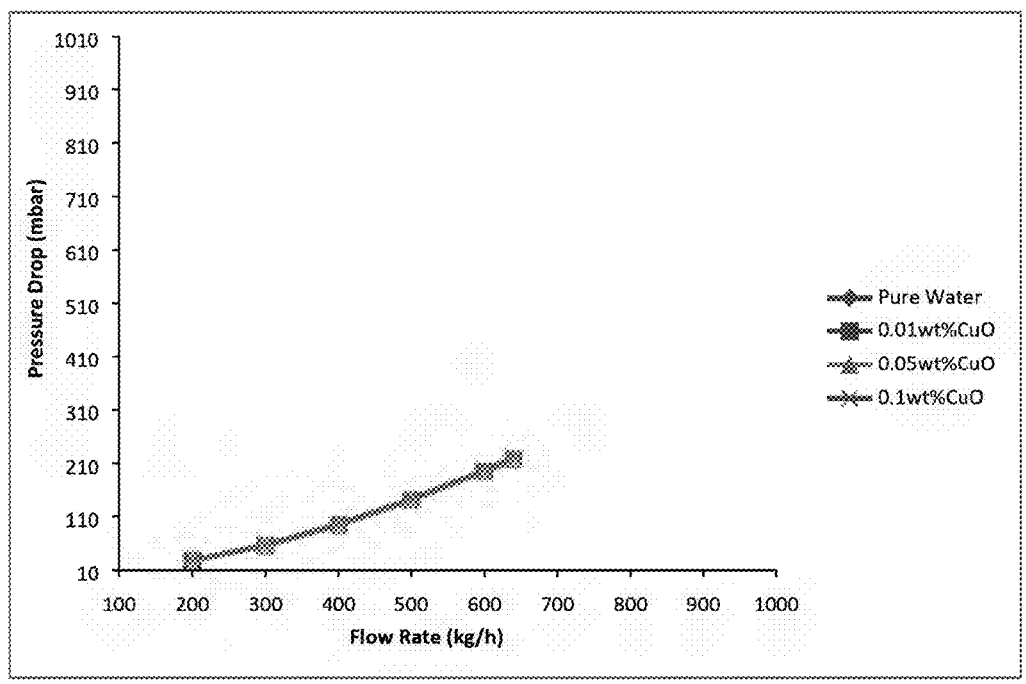
FIG. 29A is a graph of variation in the pressure drop with respect to the mass flow rate in steel tube for 10% MWCNT-CuO nanofluids and FIG. 29B is a graph of variation in the pressure drop with respect to the mass flow rate in steel tube for 1% MWCNT-CuO.
Figure 29B:
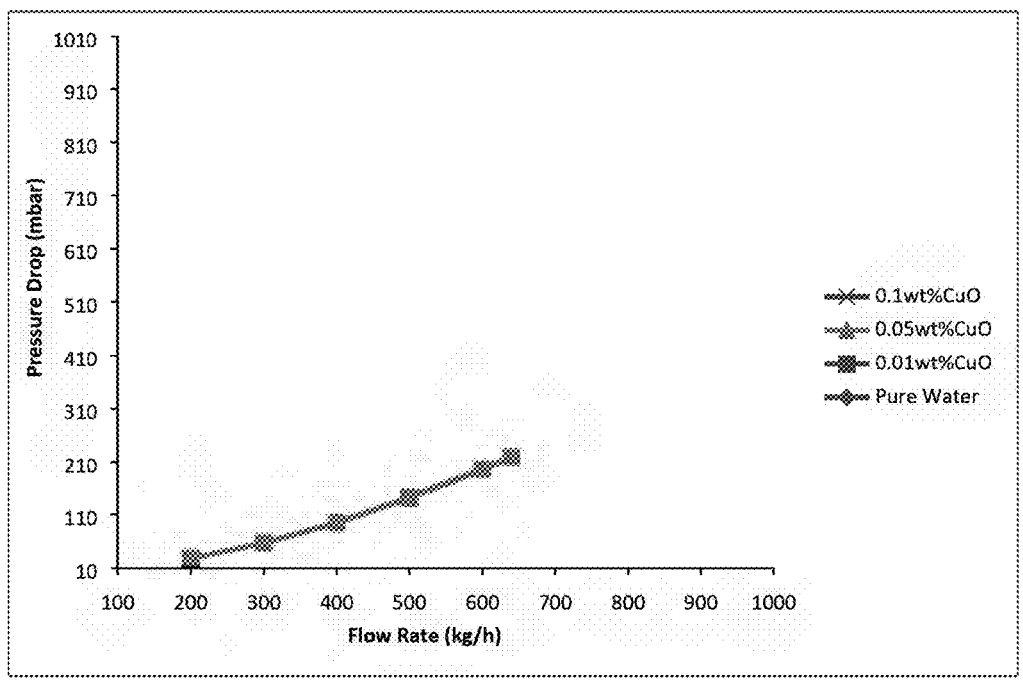

A differential pressure transmitter was used to measure the pressure drop between the inlet and outlet tube. The pressure drop is measured for the turbulent flow regime with Reynolds number varying from 5000 to 25,000. FIG. 27A-C shows the variation of the pressure drop as a function of the mass flow for unmodified and modified $Fe_2O_3$-CNTs nanofluid. FIG. 28A-B show the variation of the pressure drop as a function of the mass flow for modified $Al_2O_3$-CNTs nanofluid. FIG. 29A-B shows the variation of the pressure drop as a function of the mass flow for CuO-modified CNTs nanofluid at 10% and 1%. It is observed that the pressure drop is almost constant and equivalent to water under substantially the same conditions and at different weight concentration of nanomaterials. From the previous results of viscosity, it is clear that the viscosity is increased to 3%, 3.2% and 11% for 0.01%, 0.05% and 0.1% weight concentration of CNT nanofluids respectively. An increase in the nanofluids temperature leads to a decrease in the viscosity of the nanofluids, which results in a reduction in the pressure drop. The presence of the nanoparticles on the fluid may lead to an increase the pressure drop of the system, however, herein was observed that the nanomaterials do not affect the pressure drop of the system due the surface roughness of the nanomaterials which is very low. In addition, the viscosity of modified and unmodified nanofluids decreases at high shear rate due to its shear thinning effect, and arrangement of nanotubes at high shear rates.

The invention claimed is:

1. A water-based nanofluid heat transfer medium comprising:
   a base fluid comprising an aqueous fluid;
   a solid nanocomposite particle comprising a multi-wall carbon nanotube having a 10 to 20 nm outer diameter and a length from 10 to 30 μm and a metal oxide nanoparticle selected from the group consisting of $Fe_2O_3$, $Al_2O_3$, and CuO wherein the metal oxide nanoparticle is affixed to the outer surface of the carbon nanotube;
   wherein the carbon nanotube is not functionalized with reactive functional groups;
   wherein the solid nanocomposite particle is homogeneously dispersed in the base fluid; and
   wherein the nanofluid does not contain a surfactant.

2. The water-based nanofluid heat transfer medium of claim 1, wherein the solid nanocomposite particle comprises 0.5-13% metal oxide nanoparticles by weight based on the total weight of the nanocomposite particle.

3. The water-based nanofluid heat transfer medium of claim 1, wherein the solid nanocomposite particle comprises 0.5-3% metal oxide nanoparticles by weight and the metal oxide nanoparticle is a crystal particle with a longest diameter of 0.5-10 nm.

4. The water-based nanofluid heat transfer medium of claim 3, wherein the solid nanocomposite particle reaches a maximum % weight loss at 530-570° C. under a thermal degradation condition in an air atmosphere.

5. The water-based nanofluid heat transfer medium of claim 1, wherein the solid nanocomposite particle comprises 7-13% metal oxide nanoparticles by weight and the metal oxide nanoparticle is a crystal particle with a longest diameter of 1-20 nm.

6. The water-based nanofluid heat transfer medium of claim 5, wherein the solid nanocomposite particle reaches a maximum % weight loss at 480-520° C. under a thermal degradation condition in an air atmosphere.

7. The water-based nanofluid heat transfer medium of claim 1, wherein the nanofluid comprises 0.005-0.15% solid nanocomposite particles by weight based on the total weight of the nanofluid.

8. The water-based nanofluid heat transfer medium of claim 7, wherein the kinematic viscosity of the nanofluid is 1-13% greater than the base fluid alone at temperatures ranging from 25-65° C.

* * * * *